United States Patent
Andelman et al.

(10) Patent No.: US 6,709,560 B2
(45) Date of Patent: Mar. 23, 2004

(54) CHARGE BARRIER FLOW-THROUGH CAPACITOR

(75) Inventors: Marc D. Andelman, Worcester, MA (US); Gregory S. Walker, Grafton, MA (US)

(73) Assignee: Biosource, Inc., Worcester, MA (US)

( * ) Notice: Subject to any disclaimer, the term of this patent is extended or adjusted under 35 U.S.C. 154(b) by 0 days.

(21) Appl. No.: 10/015,120

(22) Filed: Oct. 26, 2001

(65) Prior Publication Data

US 2002/0167782 A1 Nov. 14, 2002

Related U.S. Application Data

(63) Continuation-in-part of application No. PCT/US01/12641, filed on Apr. 18, 2001.

(51) Int. Cl.[7] ................................................. C25B 9/00
(52) U.S. Cl. ........................ 204/630; 205/634; 205/636
(58) Field of Search .............................. 204/632, 633, 204/634, 636

(56) References Cited

U.S. PATENT DOCUMENTS

| | | | |
|---|---|---|---|
| 3,244,612 A | 4/1966 | Murphy ...................... 204/294 |
| 3,515,664 A | 6/1970 | Johnson et al. | |
| 3,869,376 A | 3/1975 | Tejeda ......................... 204/301 |
| 4,165,273 A | 8/1979 | Azarov et al. ............... 204/301 |
| 4,608,140 A | 8/1986 | Goldstein .................. 204/182.3 |
| 4,632,745 A | 12/1986 | Giuffrida et al. ............. 204/301 |
| 4,747,929 A | 5/1988 | Siu et al. ..................... 204/301 |
| 4,956,071 A | 9/1990 | Giuffrida et al. ............. 204/301 |
| 5,094,732 A | * 3/1992 | Oldani et al. ................ 204/529 |
| 5,192,432 A | 3/1993 | Andelman ............... 210/198.2 |
| 5,196,115 A | 3/1993 | Andelman ............... 210/198.2 |
| 5,200,068 A | 4/1993 | Andelman ............... 210/198.2 |
| 5,308,466 A | 5/1994 | Ganzi et al. ................. 204/151 |
| 5,360,540 A | 11/1994 | Andelman ............... 210/198.2 |
| 5,415,768 A | 5/1995 | Andelman ............... 210/198.2 |
| 5,503,729 A | 4/1996 | Batchelder et al. .......... 204/630 |
| 5,538,611 A | 7/1996 | Otowa ......................... 204/550 |
| 5,547,581 A | 8/1996 | Andelman ................... 210/656 |
| 5,558,753 A | 9/1996 | Gallagher et al. ........... 204/632 |
| 5,620,597 A | 4/1997 | Andelman ............... 210/198.2 |
| 5,706,165 A | 1/1998 | Saito et al. .................. 361/502 |
| 5,748,437 A | * 5/1998 | Andelman ................... 361/302 |
| 5,776,384 A | 7/1998 | Firsich et al. ............... 264/29.4 |
| 5,779,891 A | * 7/1998 | Andelman ............... 210/198.2 |
| 5,858,191 A | 1/1999 | DiMascio et al. ........... 204/524 |
| 5,868,915 A | 2/1999 | Ganzi et al. ................. 204/524 |
| 5,910,237 A | * 6/1999 | Moulton et al. ............. 204/541 |
| 6,094,788 A | 8/2000 | Farahmandi et al. ........ 25/25.41 |
| 6,127,474 A | 10/2000 | Andelman ................... 524/495 |
| 6,214,204 B1 | 4/2001 | Gadkaree et al. ........... 205/758 |

FOREIGN PATENT DOCUMENTS

| | | |
|---|---|---|
| EP | 0 436 436 B1 | 8/1994 |
| JP | 04-14309 | 1/1992 |
| JP | 09-320906 | 12/1997 |
| JP | 10-50565 | 2/1998 |
| JP | 11-102845 | 4/1999 |
| JP | 11-162795 | 6/1999 |
| JP | 11-232383 | 8/1999 |
| JP | 11-251197 | 9/1999 |
| JP | 2000-169128 | 6/2000 |
| JP | 2000-315627 | 11/2000 |
| JP | 2001-110689 | 4/2001 |
| WO | WO 98/15962 | 4/1998 |
| WO | WO 01/45121 A1 | 6/2001 |

* cited by examiner

*Primary Examiner*—Patrick Ryan
*Assistant Examiner*—Thomas H. Parsons
(74) *Attorney, Agent, or Firm*—Leslie Meyer-Leon, Esq.; IP Legal Strategies Group P.C.

(57) ABSTRACT

Flow-through capacitors are provided with one or more charge barrier layers. Ions trapped in the pore volume of flow-through capacitors cause inefficiencies as these ions are expelled during the charge cycle into the purification path. A charge barrier layer holds these pore volume ions to one side of a desired flow stream, thereby increasing the efficiency with which the flow-through capacitor purifies or concentrates ions.

75 Claims, 16 Drawing Sheets

CHARGE BARRIER FLOW-THROUGH CAPACITOR

CROSS-REFERENCES TO RELATED APPLICATIONS

This application is a continuation-in-part of International Application No. PCT/US01/12641, with an international filing date of Apr. 18, 2001, designated to be published in English under PCT Article 21(2), and hereby incorporated by reference.

STATEMENT REGARDING FEDERALLY-SPONSORED RESEARCH OR DEVELOPMENT

This invention was funded under contract with the United States Defense, Advanced Research Projects Agency (DARPA), under Contract No. DAAD 19-99-C-0033. The United States government may have certain rights in the invention.

FIELD OF THE INVENTION

The invention relates to a flow-through capacitor for deionizing or decontaminating a fluid.

BACKGROUND OF THE INVENTION

The invention relates to flow-through capacitors for deionizing solutions, e.g., aqueous solutions, with improved operation at concentrated solutions, including such applications as low energy desalination of seawater.

Technologies to deionize water include electrodeionization and flow-through capacitors. The term electrodeionization, including electrodialysis and continuous electrodeionization, has traditionally referred to a process or device that uses electrodes to transform electronic current into ionic current by oxidation-reduction reactions in anolyte and catholyte compartments located at the anodes and cathodes. Traditionally, ionic current has been used for deionization in ion-depleting compartments, and neither the anolyte chambers, the catholyte chambers nor the oxidation-reduction products have participated in the deionization process. In order to avoid contamination and to allow multiple depletion compartments between electrodes, the ion-concentrating and ion-depleting compartments were generally separated from the anolyte and catholyte compartments. To minimize formation of oxidation-reduction products at the electrodes, electrodeionization devices typically comprise multiple layers of ion-concentrating and ion-depleting compartments, bracketed between pairs of end electrodes.

One disadvantage of prior art systems is the energy loss resulting from using multiple compartment layers between electrodes, thereby creating an electrical resistance. This is generally true of prior art electrodeionization devices and is one characteristic that differentiates them from flow-through capacitors.

Flow-through capacitors differ in a number of other ways from electrodeionization devices as well. One difference is that flow-through capacitors purify water without oxidation-reduction reactions. The electrodes electrostatically adsorb and desorb contaminants, so that the electrode (anode and cathode) compartments participate directly in deionization and are located within one or both of the ion-depleting and ion-concentrating compartments. The anolyte and catholyte are partly or largely contained within a porous electrode. Electronic current is generally not transmuted by an oxidation-reduction reaction. Instead, charge is transferred by electrostatic adsorption.

However, flow-through capacitors of the prior art become energy inefficient and impractical at high ion or contaminant concentrations. The reason for this is due to the pore volume in the electrodes. Dissolved counterion salts present in the pore volume adsorb onto the electrodes, whereas pore volume coion salts are expelled from the electrodes. This has a doubly deleterious effect. Counterions occupy capacitance within the electrode. This amount of charge-holding capacitance is therefore unavailable for purification of ions from the feed water purification stream. Coions expelled from the electrodes enter the feed water purification stream and contaminate it with additional ions. This effect becomes worse with increased concentration. The flow-through capacitor is typically regenerated into liquid of the feed concentration. When purifying a concentrated liquid, ions are passively brought over into the pores prior to application of a voltage or electric current. Once voltage is applied, these ions are simultaneously adsorbed and expelled during the purification process. Purification can only occur when an excess of feed ions, over and above the pore volume ions, are adsorbed by the electrodes. This puts an upper practical limit on the economy of the flow-through capacitor, typically in the range of approximately 2500 to 6000 parts per million (ppm). The flow-through capacitor of the prior art requires both slower flow rates and higher energy usage. Beyond 6000 ppm, the energy usage required is typically more than 1 joule per coulomb of dissolved ions, making prior art flow-through capacitors too energy intensive to be practical. Seawater, which has ion concentrations of approximately 35,000 ppm, becomes impractical to deionize due to energy inefficiency caused by these pore volume losses. Pore volume losses occur at all concentrations but get worse at higher concentrations. Another way to describe pore volume losses is that they cause diminished ionic efficiency. Ionic efficiency is defined as the ratio of coulombs of ions purified to coulombs of electrons utilized.

Thus, a need exists to improve the ionic and energy efficiency of flow-through capacitors, particularly when treating solutions with ion concentrations in excess of 2500 ppm. A further need exists for a flow through capacitor to purify solutions with an energy usage of less than 1 Joule per Coloumb of purified ionic charge. Ionic efficiency is the coulombs of ionic charge purified per coulombs of electrons used, and should be 50% or more.

SUMMARY OF THE INVENTION

It has been discovered that a charge barrier placed adjacent to an electrode of a flow-through capacitor can compensate for the pore volume losses caused by adsorption and expulsion of pore volume ions. Using the charge barrier flow-through capacitor of the invention, purification of water, such as a seawater concentrated solution, e.g., of 35,000 ppm NaCl, has been observed at an energy level of less than 1 joules per coulomb ions purified, for example, 0.5 joules per coulomb ions purified, with an ionic efficiency of over 90%.

As used herein, the term "charge barrier" refers to a layer of material which is permeable or semipermeable and is capable of holding an electric charge. Pore ions are retained, or trapped, on the side of the charge barrier towards which the like-charged ion, or coion, migrates. This charge barrier material may be a laminate which has a conductive low resistance-capacitance (RC) time constant, an electrode material, or may be a permselective, i.e., semipermeable, membrane, for example a cation or anion permselective material, such as a cation exchange or anion exchange membrane. The charge barrier may have a single polarity, two polarities, or may be bipolar. Generally, a charge barrier functions by forming a concentrated layer of ions. The effect of forming a concentrated layer of ions is what balances out, or compensates for, the losses ordinarily associated with pore volume ions. This effect allows a large increase in ionic efficiency, which in turn allows energy efficient purification of concentrated fluids.

DETAILED DESCRIPTION

Figure 1:
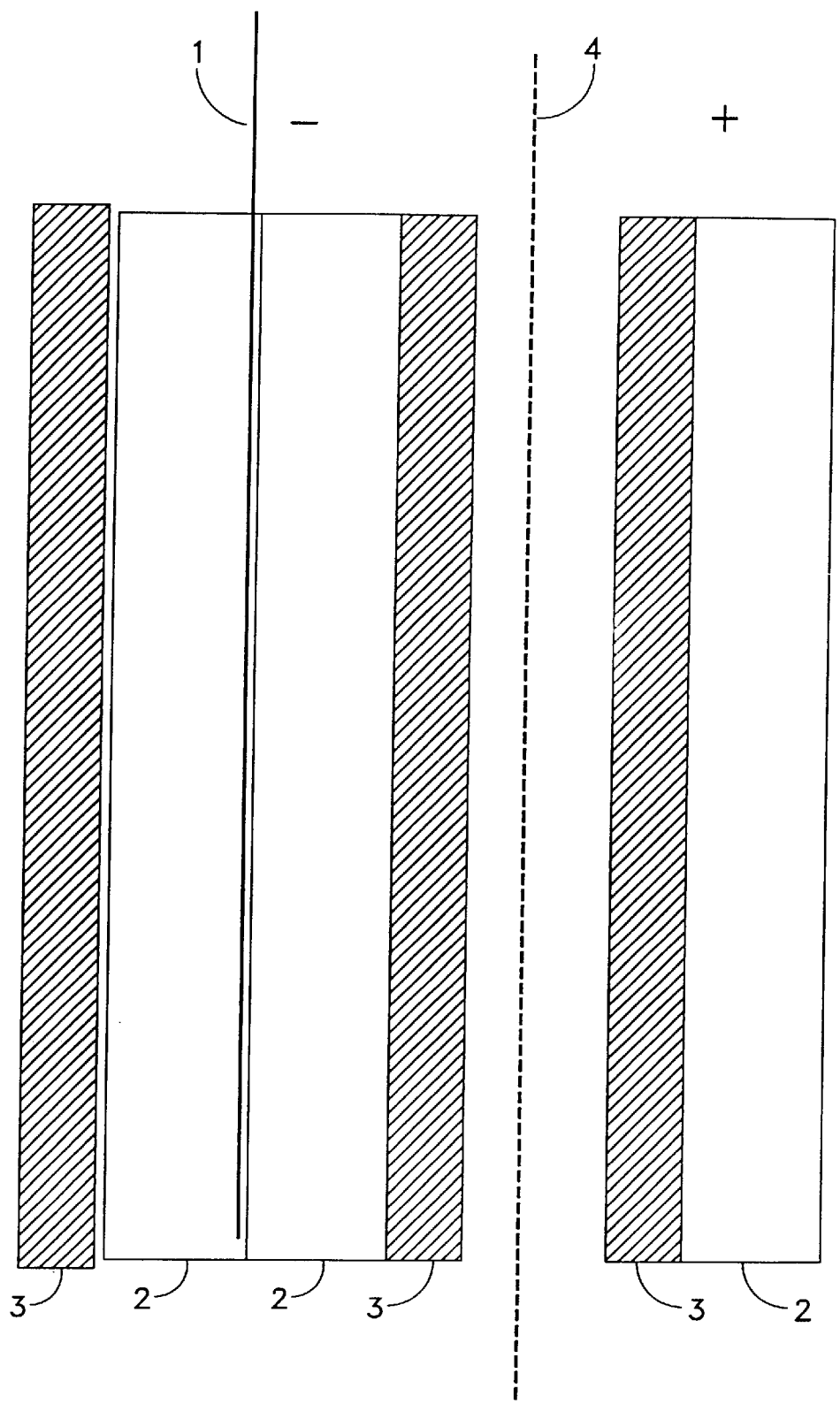
FIG. 1 is a generalized, schematic view of a flow-through capacitor of the invention, illustrating the placement of charge barrier layers, electrodes, an optional current collector, and a flow channel spacer.

In the charge barrier flow-through capacitor of the invention, the anolyte and catholyte chambers may be integral with ion-depletion or concentrating chambers, or they may be separate chambers. The electrodes in flow-through capacitors are spaced apart or are separated by a spacer. The spacer may be any ion-permeable, electronically-nonconductive material, including membranes and porous and nonporous materials (see U.S. Pat. No. 5,748,437, issued May 5, 1998, hereby incorporated by reference). The spacer may define a flow channel (see U.S. Pat. No. 5,547,581, issued Aug. 20, 1996, hereby incorporated by reference, or may be of a double-layer spacer material with the flow channel between the layers (as in U.S. Pat. No. 5,748,437). Purification and concentration may take place in either the spacers, the electrodes, or both, depending upon the geometry of the flow channel. For example, in a flow-through capacitor utilizing a double-layer spacer as described above, the ion-depleting, purification, or concentration compartment may be located between the spacer layers. U.S. Pat. No. 5,192,432, issued Mar. 9, 1993, hereby incorporated by reference, describes use of a porous electrode material. In this case, ion depletion or ion concentration would occur directly in the electrodes themselves, in order to affect purification or concentration of a fluid. In both cases, however, the electrodes are directly involved in the purification process. The electrodes are used to adsorb or release a charge, and, generally, do not transfer electronic to ionic current by oxidation-reduction reactions common to electrodeionization technologies. In either case, no more than a single, separately-compartmentalized, concentrating or ion-depleting layer is required between each set of electrodes. Therefore, one advantage the flow-through capacitor has over deionization is that less energy is wasted by oxidation-reduction reactions and there is less internal resistance.

In the flow-through capacitor of the present invention, the charge barrier may have just one layer or the charge barrier may have two or more layers. Ion selective membranes may also be used to select for particular species of ions of interest. Where the charge barrier is a permselective membrane, it may be any membrane, e.g., a nonwoven, a woven, or a semipermeable sheet material. Examples of materials for use as charge barriers are available commercially, e.g., Raipore 1010 and 1030, Tokuyama Soda NEOSEPTA® CM-1 and AM-1, (NEOSEPTA® is a registered trademark of Tokuyama Corporation of Mikage-cho Tokuyama City, Yamaguchi Prefecture Japan) and Selemnion brand anion and cation exchange membranes. These membranes may be supported by a web or may be manufactured, cast, or attached integrally to the electrode material. Bipolar membranes may also be used.

Where the charge barrier material may be a low resistance multiplied by capacitance, low resistance-capacitance (RC)

time constant material, this material may be an ionically-permeable, conductive, porous, or nonporous sheet material, for example, conductive membranes, conductive polymer sheet materials, carbon fibrous materials, either in a nonwoven or woven, e.g., woven cloth form, activated carbon cloths, nanotubes, carbon or graphite tissue, aerogel, metal mesh or fibers, perforated graphite or metal foil, activated carbon, and carbon black sheet materials, including carbons held together with a polytetrafluoroethylene (PTFE) binder. These conductive materials may also be derivatized with the same ionically charged groups common to anion and cation exchange membranes. It is desirable for the electrodes of the invention to have an RC time constant of less than 1000, for example, less than 50.

Generally, any binder material used in, but not limited to, any of the patents incorporated by reference herein, such as those binders used in electric, double-layer capacitors, may itself be derivitized with anionic or cationic groups to form a charge barrier integrated homogenously into an electrode.

An example of these low RC time constant, conductive charge barrier materials is a low surface area, low capacitance, carbon black bound with PTFE. For example, materials with a capacitance of less than 20 farads/gram or 30 farads/cm$^2$ (as measured in concentrated sulfuric acid) may be used. A non-electrically conductive, ion-permeable spacer may be placed between the electrode and the charge barrier material in order to facilitate formation of a reverse electric field. In this case, the charge barrier material may have integral leads, or, may have its own current ion-permeable collector with leads. These leads may be hooked up in parallel with the electrode leads or may be powered by a separate power supply. Optionally, the separate power supply may be set to a voltage that is higher than the power supply connected to the electrodes.

In this way, the charge barrier materials contain a higher voltage than the electrode materials. One advantage of a discrete power supply is that the charge barrier materials may remain permanently charged, or may be charged to a higher voltage than the electrode materials, thereby enhancing the reverse electric field. It is this reverse electric field which forms a charge barrier to pore volume ions, thereby increasing ionic efficiency of the flow-through capacitor. Alternatively, the same power supply may be used for both the electrodes and the charge barrier. Optionally, a resistor may be added to the electrode lead circuits.

In order to further increase ionic efficiency, charge barriers may include membranes, coatings, or layers with less than 10% porosity or microporosity. Ionic efficiency of over 70% is desirable, as defined by the ratio of coulombs of ions absorbed to the capacitor electrodes to the coulombs of electrodes moved through the electronic circuit into the capacitor. Alternatively, charge barriers may have more than 10% porosity, in micro, meso, or macro pores, for example, between 10 nm and 1000 micron pores. A porous charge barrier acts more like an ion exchange media that adds additional ion absorption ability to the underlying electrodes. Porous charge barriers allow concentration of product fluid during the shunt cycle in which the capacitor is electrically discharged, reduced in voltage, or short-circuited to zero volts. Likewise, porous charge barriers allow purification on either polarity of voltage, or, offer a short concentration peak followed by a purification peak. A single layer charge barrier or porous charge barrier flow-through capacitor, such as that shown in FIG. 15, or, double-layer charge barrier cells, may sometimes show deeper purification and more concentrated concentration every other charge cycle of like polarity.

In these cases, it may be advantageous to save the product fluid from relatively less purified cycles, or portions of cycles, particularly within the beginning and end one-third of a particular cycle, in order to feed this back into the alternate cycles which produce the more purified or more concentrated product water. The reverse of the above, feeding more purified cycle into a less purified cycle, may also be done. A conductivity sensor, timer, or counting means may select water from particular cycles by triggering a three-way valve once water conductivity climbs above a conductivity set point and by use of this valve, direct this flow to an accumulation tank, bladder tank, or in series flow through another flow-through capacitor. Single or multiple cycles may be pooled together this way. Where purification cycles alternate as above, this partly purified water may be directed to the alternate cycle in the same or in another capacitor, which produces the higher degree of purification. Four or more capacitors may be used to combine series flow with staggered purification and concentration cycles in order to achieve a continuous product of over 50% purified, for example, over 95% purified, and continuous wastewater flow concentrated over 50% concentrated. A minimum of two flow-through capacitors is required in order to provide staggered continuous purification and concentration cycles. Purification cycles are relative to each other or to the feed water concentration or conductivity.

Any electrode material suitable for use in a flow-through capacitor may be used as the underlying electrode material for the present invention. For example, small particle size carbons have lower series resistance. Carbon particles of less than 10 microns, for example, 1 micron or less, may be formed into an electrode sheet with PTFE or other binders and calendered or extruded into sheet electrodes of less than 0.02 inches thick with low series resistance, e.g., less than 40 ohm cm$^2$, where cm$^2$ is the spacer area.

The charge barrier material may preferably be combined with the electrode. In this way, the electrode itself offers structure and strength, so that a thin, weak charge barrier may be used. For example, a thin coating of a charge barrier ion exchange material may be applied directly onto the electrode. Alternatively, the charge barrier material may be directly infiltrated into the electrode, especially if the electrode is porous or provided with holes as exemplified in U.S. Pat. No. 6,214,204 (hereby incorporated by reference). A preferred embodiment is to provide a carbon electrode with a secondary pore structure that is larger than the primary surface area pores. These large secondary pores may be coated with or infiltrated with an anion or cation exchange material. Since the electrodes provide strength, the ion exchange groups on the charge barrier material may be supported on a hydrogel, for example polyacrylamide or polysaccharide material. Suitable ion exchange membrane formulations and ionic groups may include, for example, perfluorinated films, NAFION™, carboxylate or sulfonate polymers, perfluorinated sufonic acid, a mixture of styrene and divinylbenzene, olefins and polyolefins, or any polymer derivatized with various ionic groups, including sulfonyl halide, amine, diamine, aminated polysulfone, carboxyl, sulfate, nitrate, phosphate, chelating agent, ethylenediaminetetraacetic acid (EDTA), cyanide, imine, polyethyleneimine, amide, polysulfone, or any other fixed ionic group may be used as the charge barrier material. See also, Thomas A. Davis et al, *A First Course In Ion Permeable Membranes* (The Electrochemical Consultancy, Hants, England, 1997).

Another preferred embodiment of the present invention is to combine the charge barrier within the structure of the electrode. Any electrode material that has through holes, or which has a porous structure, may be used. The porous structure may include a combination of pore sizes, for example, macropores, micron-sized pores or larger, combined with meso or micro pores in order to improve conductivity of ions into the electrode and accessibility of the surface area. The charge barrier material may be infiltrated into this pore structure in order to form a combined electrode-charge barrier material that may be used as spaced-apart electrodes or with any flow spacer.

For use in the present invention, capacitor electrodes, electrode properties, spacers, material properties, and methods of manufacture will be known to those skilled in the art. For example, guidance is provided in connection with carbon double-layer capacitors, including but not limited to the following documents, each of which is hereby incorporated by reference: U.S. Pat. No. 5,558,753, issued Sep. 24, 1996; U.S. Pat. No. 5,706,165, issued Jan. 6, 1998; U.S. Pat. No. 5,776,384, issued Jul. 7, 1998; U.S. Pat. No. 6,094,788, issued Aug. 1, 2000. See also, PCT International Application Nos. WO 98/15962, published Apr. 16, 1998; and WO 01/45121 A1, published Jun. 21, 2001; and EP Patent No. 0 436 436 B1, published Aug. 17, 1994.

With the addition of charge barrier layers and flow paths, any electrode geometry of capacitor housing or cartridge ordinarily used in double-layer capacitors, including but not limited to the above, may be used to make a flow-through capacitor of the present invention. Flow paths may be formed by creation of inlets and outlets through capacitor housings, including but not limited to those referenced herein, while at the same time sealing capacitor layers against the housing to direct fluid flow through or across the layers of capacitor materials, and to prevent fluid channeling around, over, or under the layers of capacitor materials.

Systems designed for the charge barrier flow-through capacitor, or for flow-through capacitors generally, may be any design used in electrodialysis, ion exchange, or reverse osmosis, including but not limited to U.S. Pat. No. 5,558,753, issued Sep. 24, 1996, which is hereby incorporated by reference.

As mentioned previously, extra purification compartments increase electro-static resistance (ESR) and increase energy usage. However, especially when combined with energy recovery, an additional embodiment of the present invention would be to include multiple ion-depleting and ion-concentrating compartments between the capacitor electrodes. Unlike electrodialysis, the end electrodes would still participate in ion depletion or concentration to the extent that they adsorb or desorb ions. The major improvement of such a device over electrodialysis would be the opportunity to recover energy from the capacitor electrodes. These multiple compartments would consist of multiple pairs, from two to one hundred or more, of like or oppositely charged ion-exchange membranes or charge barriers separated by a flow spacer. These charge barrier pairs would be placed between capacitance-containing electrodes. Alternating ion-depletion or concentration channels could be gasketed using any means common to electrodialysis or electrodeionization.

FIG. 1 shows a generalized drawing of a charge barrier flow-through capacitor, with electrode 2, charge barrier 3, spacer 4, and optionally, current collector 1. An electrode 2 is prepared from a high capacitance material, preferably with a capacitance of over 1 farad per gram or 1 farad per cubic centimeter (as measured in concentrated sulfuric acid). The charge barrier 3 may be a permselective membrane of either polarity and either the same polarity as each other or an opposite polarity. The charge barrier 3 may also be a bipolar membrane. The charge barrier 3 may also be prepared from an electrode material with a lower RC time constant than the underlying electrode 2, and either laminated during manufacture directly upon and integral to electrode 2, or simply laid together separately. For the best results, the electrode material should have an RC time constant that is at least twice as high as the RC time constant of the charge barrier 3. In order to improve performance of the charge barrier 3, the capacitance of the underlying electrode may be reduced or resistance of the underlying electrode 2 may be increased relative to the charge barrier 3 material. Ideally, the electrode 2 RC time constant may be manipulated by increasing capacitance more than by increasing resistance, in order to have a low series resistance, highly energy efficient capacitor. So that the charge barrier 3 may have a lower RC time constant than the underlying electrode 2, either resistance or capacitance of the charge barrier 3 may be decreased relative to the electrode 2. However, changing either value will suffice to alter the RC time constant. During charge of such a laminated electrode 2, with the lower RC time constant material facing outward to the flow channel spacer, the outer low RC time constant electrode 2 charges up first. This creates an inverse electric field localized within the electrode 2 of the opposite direction to the electric field between the anode and cathode electrodes 2. This inverse field holds pore volume ions trapped within the electrode 2.

In order to maintain charge neutrality, counterions migrate into the electrode 2 where they form a concentrated solution with the trapped coions, thereby increasing ionic efficiency. Generally, spacer 4 may be prepared from any material which defines a flow channel, or it may be simply a space between the anode and cathode pairs of electrodes 2 that is ionically permeable and electron insulating, with flow channel 5 defined by the spacer 4, within the spacer 4, or in the layers between the spacer 4 and the electrode 2. This flow channel 5 may be formed by grooves or ribs embossed into either the spacer 4 or electrode 2. Alternatively, the spacer 4 may be an open netting, filter, particulate, or screen-printed material of any geometry that serves to space apart the electrode 2 layers and allow flow paths 5. The spacer 4 may be a doubled-up layer of material with a flow path 5 between the layers. It is desirable that the flow spacer 4 be thin, e.g., under 0.01 inches thick. Further, it is desirable that doubled-up charge permselective membranes or membranes and flow spacer combinations be thin, e.g., under 0.02 inches thick, and preferably, less than 0.01 inch thick. If the charge barrier 3 is a permselective membrane, the polarities may be the same, either negative or positive, or there may be one of each polarity, i.e., one negative and one positive. In order to limit series resistance, the electrodes 2 should also be thin, such as under 0.06 inch thick, for example, 0.02 inch thick or less. Spacing between layers should also be thin, such as under 0.06 inch, for example, 0.01 inches or less. It is important to limit leakage, because this bleeds off the charge responsible for maintaining a charge barrier.

Leakage resistance of over 100 ohm $cm^2$ is preferred, such as over 1000 ohm $cm^2$, and series resistance of under 50 ohm $cm^2$ is preferred, as measured by recording the instantaneous current upon application of 1 volt to a cell equilibrated with 0.1 M NaCl. The $cm^2$ in the ohm $cm^2$ above refers to the electrode 2 facing area, which is the same as the spacer 4 area. The ratio of leakage resistance to series resistance should be in excess of 100, such as, for example, in excess of 300.

Electrode 2 materials may be selected for nonfouling characteristics. For example, activated carbon tends to absorb organics and many ions passively. Carbon blacks, which may be selected for use, show less tendency to adsorb passively a foulant that is causing a problem with activated carbon electrodes 2. Carbon black may also be derivatized with fluorine groups in order to make it less passively adsorptive. However, for treatment of polyaromatic hydrocarbons, trihalomethane, and other organics, the passive absorptive behavior may be selected for in electrode 2. These electrode 2 materials may be electrochemically destroyed once they are adsorbed passively. To facilitate passive adsorption, it may be advantageous to provide flow pores through the current collector 1 and electrode 2 so that nonionic species may be exposed to the electrodes 2 by convective flow there through. Charge barrier 3 material may also be a permselective membrane, such as a cation, anion, or ion- specific membrane material.

Flow-through capacitors of the invention may be electrically connected in series as separate, electrically-insulated cells. These cells may be built within the same flat stacked layer or within a spirally-wound layer, flow-through capacitor. For example, individual cells containing multiple electrode pairs and other layers may be provided with an ionically-insulating component on the end of the electrode 2 stack. This ionically-insulating component may be electrically conductive so as to form an electrical series connection from one capacitive layer to the next, on opposing sides of this ionically-insulating layer. A number of cells may be rolled up in concentric spirals in order to form an electrical series, connected, flow-through capacitor with parallel fluid flow between the layers. A cell is any arrangement of layers that includes parallel pairs of electrodes 2 with the same voltage. By stacking cells in series, the voltage is additive across the stack and is therefore increased in order to take advantage of less expensive, higher voltage, lower amperage power. For example, a 480 to 600 volt stack is ideal for use with power received directly from transmission lines, without the need for transformers to step down the voltage.

Figure 2:
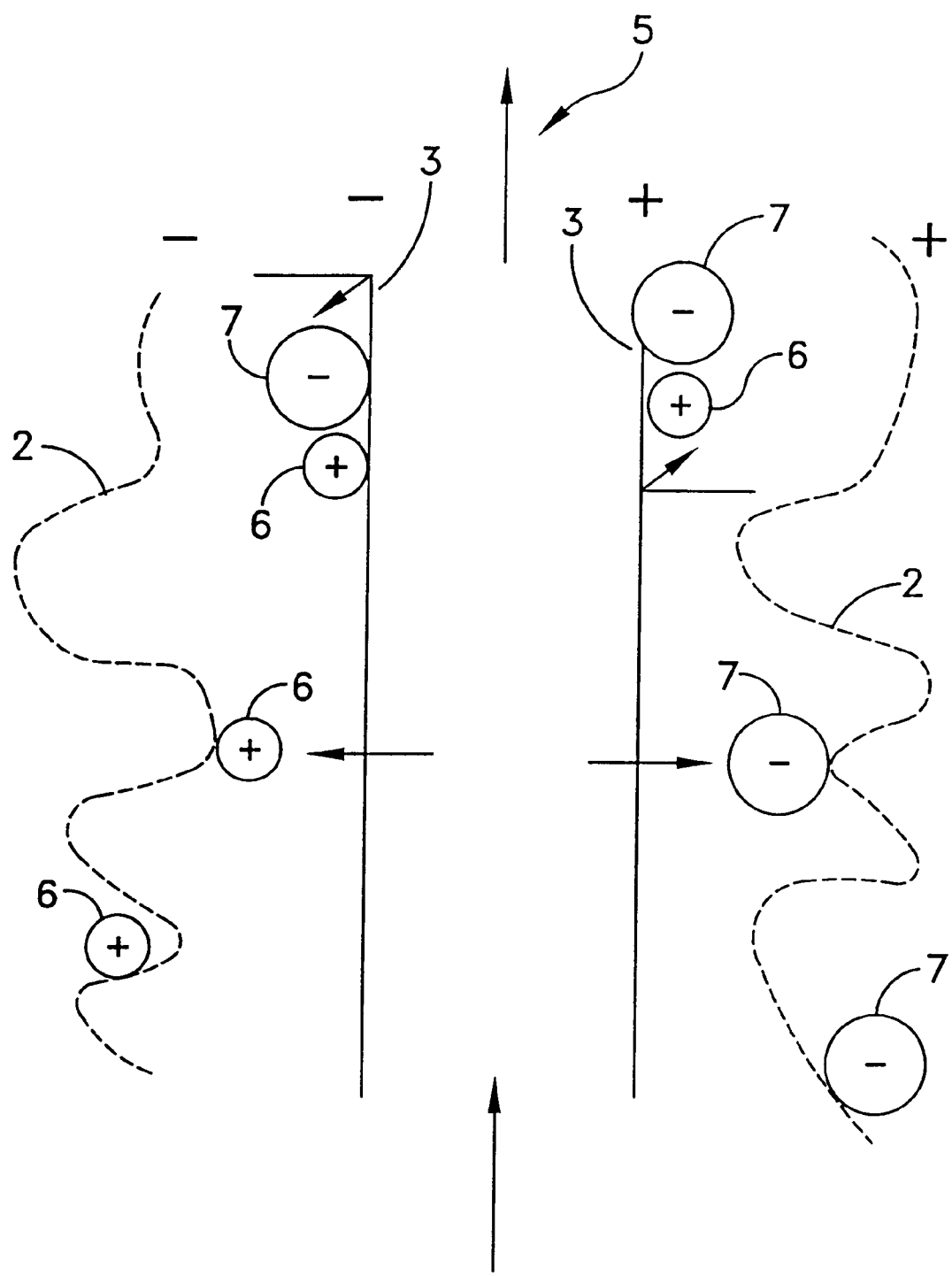
FIG. 2 is a generalized, schematic view of a flow-through capacitor of the invention, containing charge barriers of the same polarity as the adjacent or underlying electrode, together with a representation of the ions being purified or concentrated, and displaying the direction of ion migration in the electric field.

FIG. 2 represents a flow-through capacitor of the invention incorporating electrode 2 and charge barrier 3. In this case, the charge barrier 3 either has a lower RC time constant material than does electrode 2, or the charge barrier 3 is a permselective membrane of the same polarity as the adjacent electrode 2. Upon applying voltage, anions and cations are expelled from the anodes and cathodes, respectively. The ion movement is shown in FIG. 2 by the horizontal or bent arrows. These ions are repelled by and trapped, against charge barrier 3, which, if made from a low RC time constant material, has like polarities in the form of electric charges, or, in the case of a permselective membrane, has like polarities in the form of bound charges to that of the adjacent electrode 2. Ions from the flow channel 5, e.g., a central flow channel, migrate through the permselective membrane to balance the charge of these trapped ions. As a result, a concentrated solution of ions forms in the compartments surrounding electrode 2. Ions are depleted from the flow channel 5, allowing purified water to exit the flow channel 5. Counterions already present in the pore volume electrostatically adsorb on their respective electrodes 2. Although, this takes up an adsorption site, the concentrated solution formed by the trapped ions and by the charge-balancing ions make up for any loss of adsorption capacity.

In essence, the charge barrier 3 forms an inverse electric field, which keeps coions inside the electrode 2. In order to balance charge, counterions migrate into the electrode chamber where they form a concentrated solution, thereby, allowing a flow-through capacitor of improved ionic efficiency, e.g., such as 30 to 99%.

Figure 3:
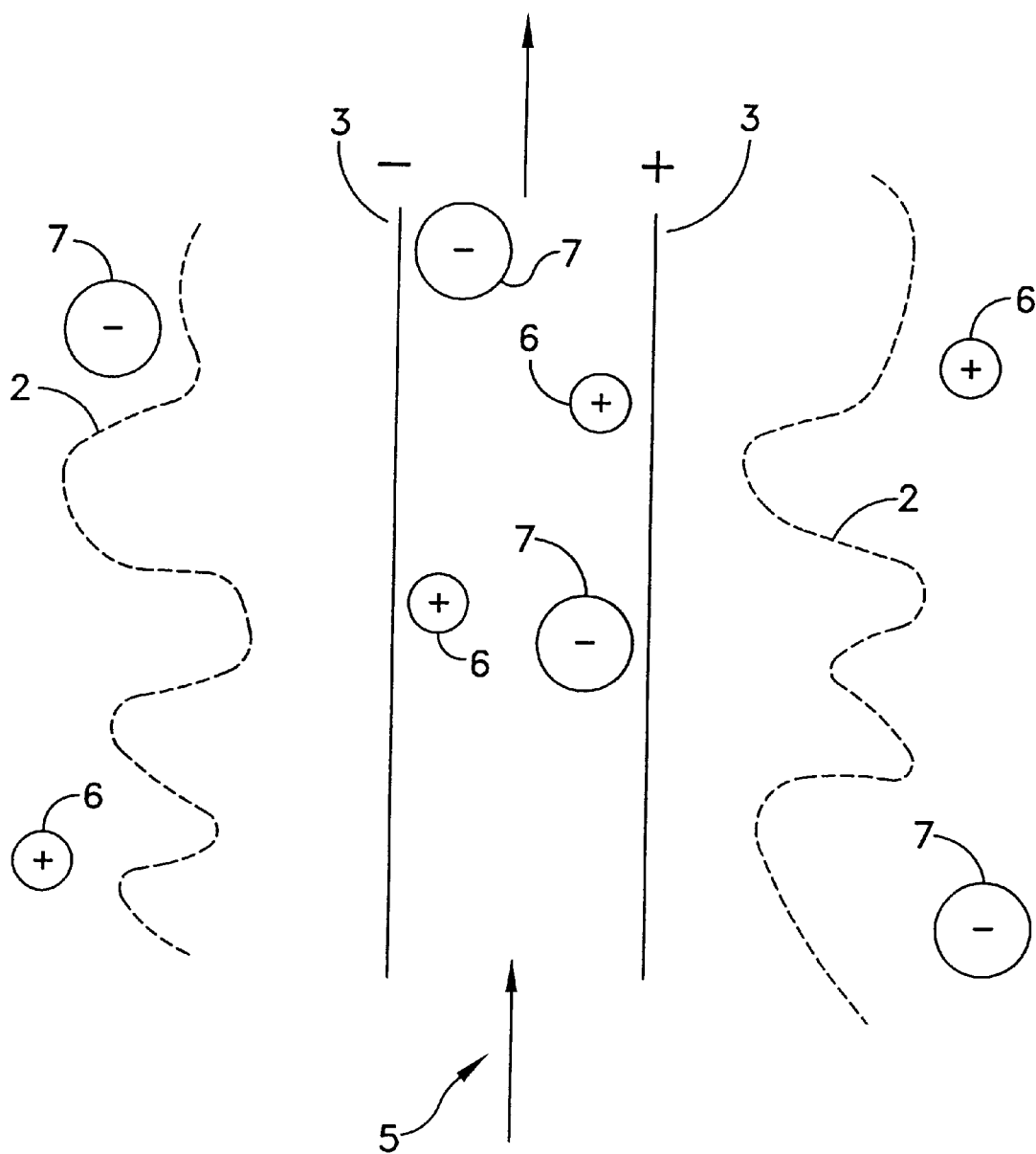
FIG. 3 represents the flow-through capacitor of FIG. 2 in the discharge cycle, illustrating the release of concentrated ions into a flow channel located between the charge barrier layers.

FIG. 3 represents the flow-through capacitor of FIG. 2 after it is discharged. Desorbed ions, together with ions that had concentrated in the electrodes 2, are discharged as a concentrate. A flow channel 5 may be formed from a spacer component (not shown). Spacer 4 may be formed from flow patterns directly embossed into the electrode 2 or from a separate flow channel 5 forming spacer 4 (shown in FIG. 1), such as, without limitation, an open netting material, screen-printed protrusions or ribs, or a nonwoven filter material.

Spacer 4 may be incorporated into one or more flow channels 5. Flow channel 5 may exist as two types, i.e., between the charge barrier 3 layers or between the electrodes 2 and charge barriers 3, or both types of flow channels 5 may exist at the same time, with each type isolated from the other type. Two simultaneous types of flow channels 5 allow for simultaneous purification and concentration.

Figure 4:
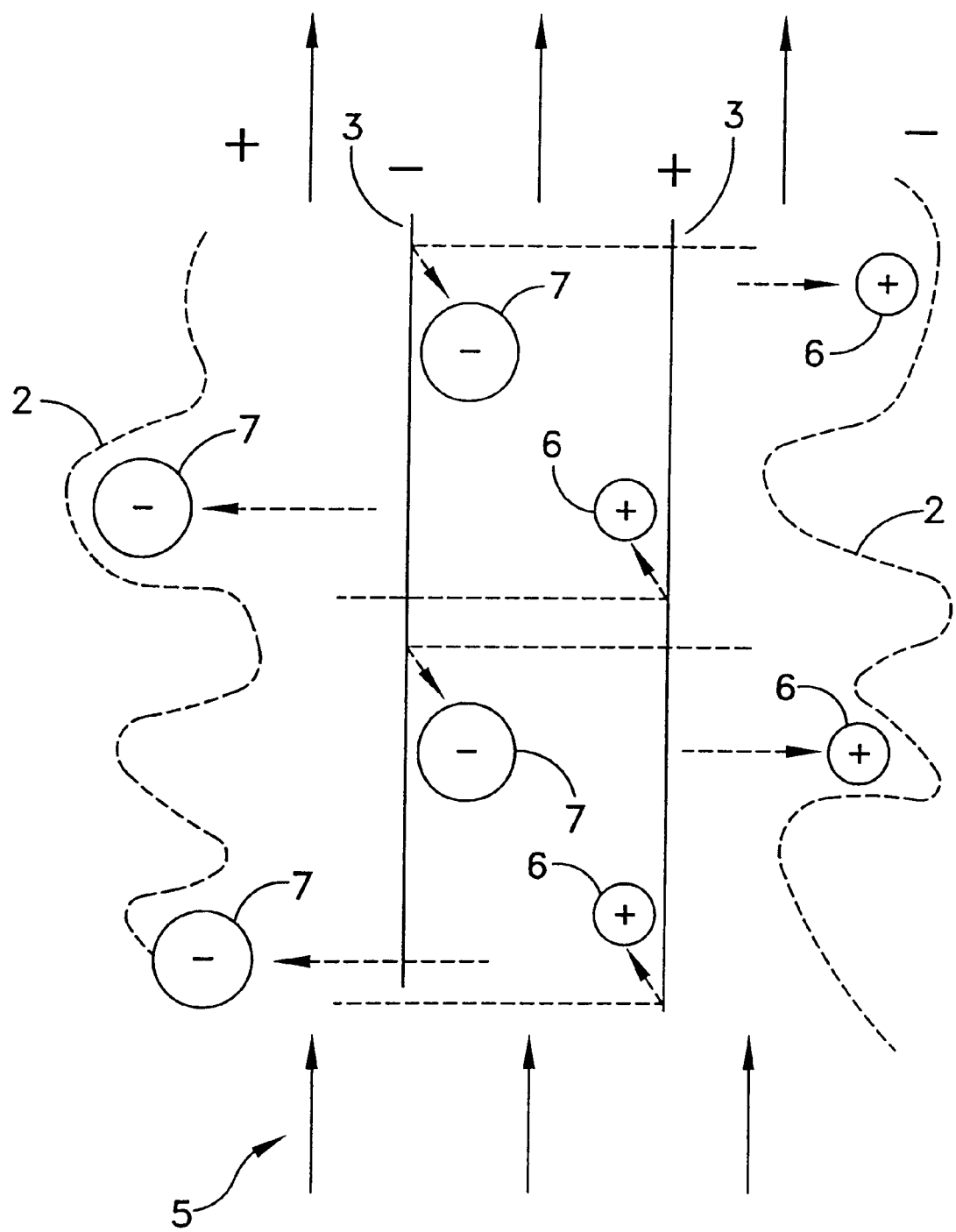
FIG. 4 is a generalized, schematic view of a flow-through capacitor of the invention, containing charge barrier layers of opposite polarity to that of the adjacent or underlying electrodes, together with representations of ions being purified or concentrated, and displaying the direction of ionic migration in the electric field.

FIG. 4 represents a flow-through capacitor with a double permselective membrane adjacent to the electrode 2, whereby the adjacent membranes are of opposite polarity to the electrode 2. This may be accomplished electronically, merely by reversing the polarity of the capacitor in FIG. 2, for example, if operating the capacitor with alternating polarity charge cycles. In the capacitor of FIG. 4, ions concentrate into the space between the membranes during application of a voltage. Flow channels 5 may be incorporated centrally, or two-sided, or both side and central. A concentrate is released from the central flow channel 5 during application of a voltage. If the side and central flow channels 5 are isolated by a gasket or sealing agent, then purified water may be retrieved from the side flow channels 5 at the same time that concentrated water is retrieved from the central flow channel 5.

Figure 5:
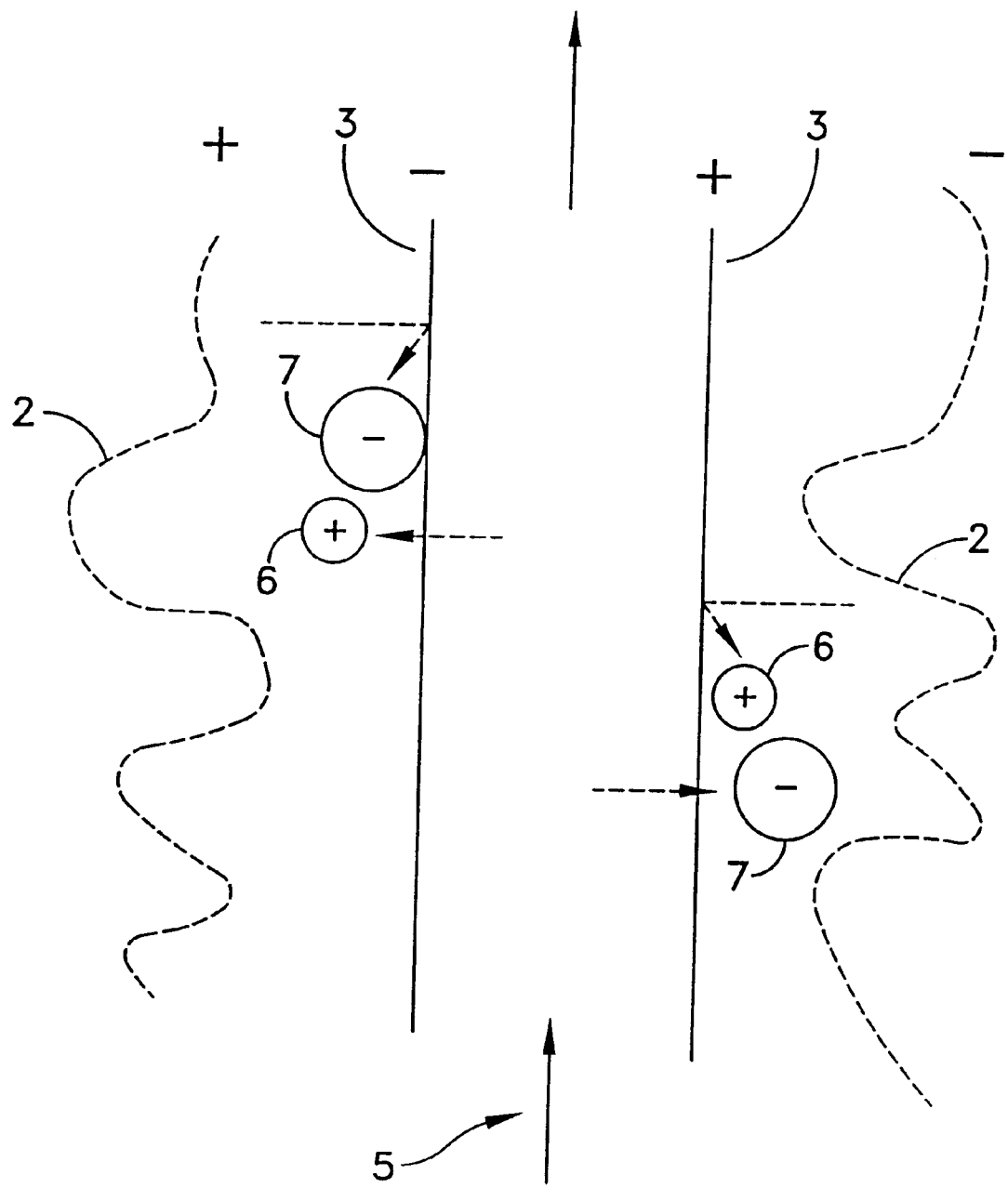
FIG. 5 is a generalized view of the discharge cycle of the flow-through capacitor of FIG. 4, which illustrates how a centrally-located flow channel is purified by virtue of ionic migration through the charge barrier layers towards the electrodes.

In FIG. 5, purified water is collected from the central flow channel 5. This mechanism is due to the fact that the discharging capacitor of FIG. 4, with opposite-charged permselective membranes adjacent to the electrodes 2, is analogous to the charging capacitor of FIG. 2, with like-charged permselective electrodes 2 adjacent to the electrodes 2. When the capacitor of FIG. 4 is discharged, an interesting observation may be made, discharging counterions become trapped between the electrode 2 and the membranes, where they draw ions from the central channel into the side channels in order to maintain electroneutrality. If isolated side flow channels 5 were also provided, concentrated fluid may simultaneously be retrieved.

By incorporating a separate flow channel 5 shown in FIGS. 2 and 4, the flow-through capacitor purifies and concentrates simultaneously. The flow-through capacitor of the invention may also have a central flow channel 5 composed of opposite or like-polarity permselective membranes. In the case of opposite-polarity membranes, the flow-through capacitor may be cycled with alternating-charge polarities. This situation is represented by the charge polarity shown in FIG. 4, followed by the discharge cycle shown in FIG. 5, followed by the polarity shown in FIG. 2 (the reverse of FIG. 4), followed by a discharge cycle. This situation creates two purification cycles in a row, followed by two concentration cycles in a row. Therefore, the flow-through capacitor of the invention may extend artificially the length of time the cell spends purifying. Depending upon the orientation of the membranes, purification or concentration can occur either upon a voltage rise or a voltage decrease. This differs markedly from flow-through capacitors of the prior art, which exhibit purification upon application of voltage of either polarity, as opposed to a change in voltage, for example, from negative towards zero.

Figure 6:
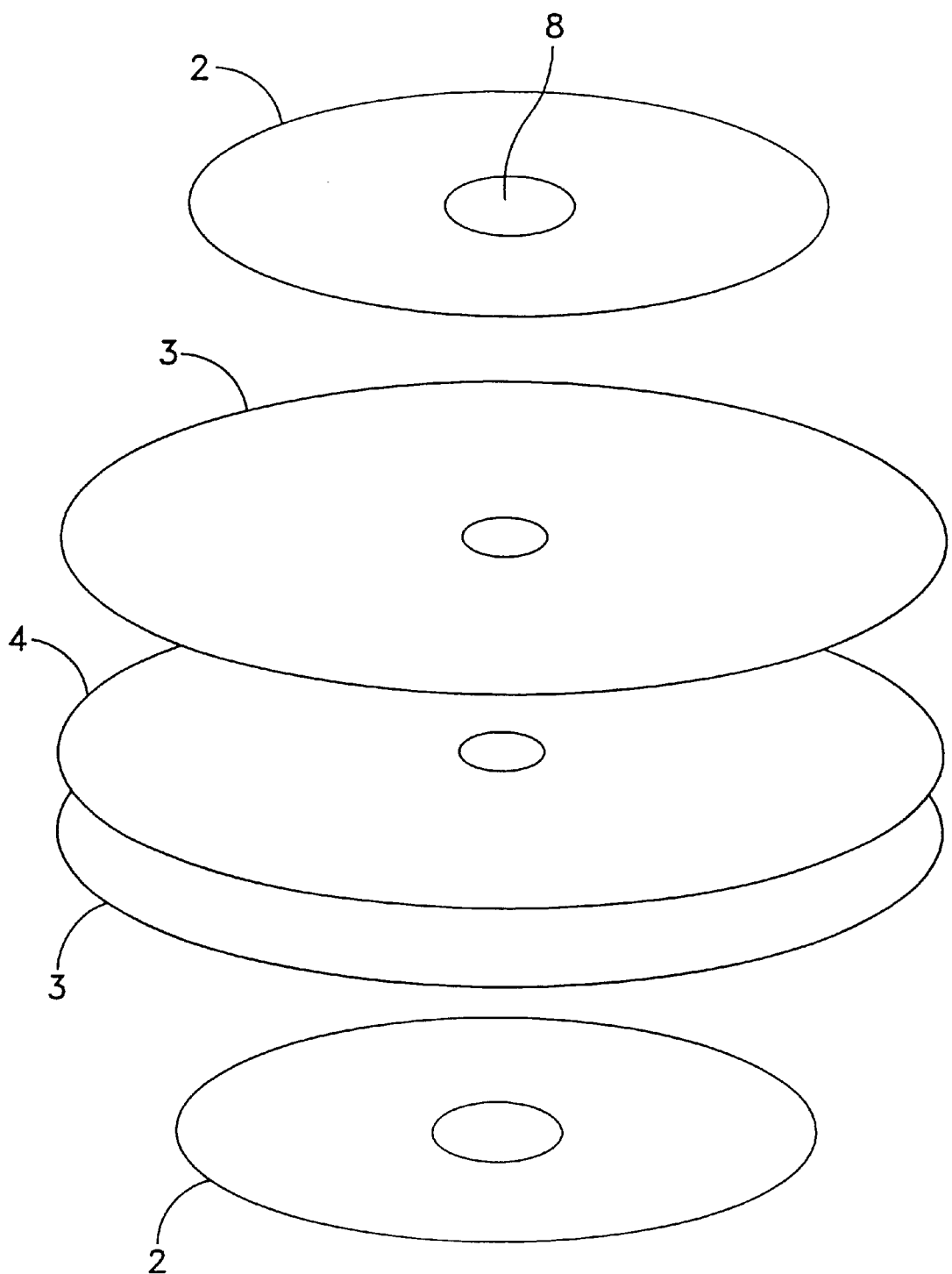
FIG. 6 is a generalized, schematic view of a stacked-layer, flow-through capacitor of the invention.

FIG. 6 shows a stacked-layer capacitor of the invention. Material layers are arranged around a central flow hole 8.

Material layers may be discs, squares, or polygons consisting of electrodes 2, charge barriers 3 materials (either lower RC time constant electrode 2 material or permselective membranes of the same or opposite polarities). Optionally, spacer 4 forms a central flow path 8. The spacer 4 may be prepared from, for example, any open netting, nonwoven cloth, loosely applied particle material, screen-printed protrusions, or ribs.

Figure 7:
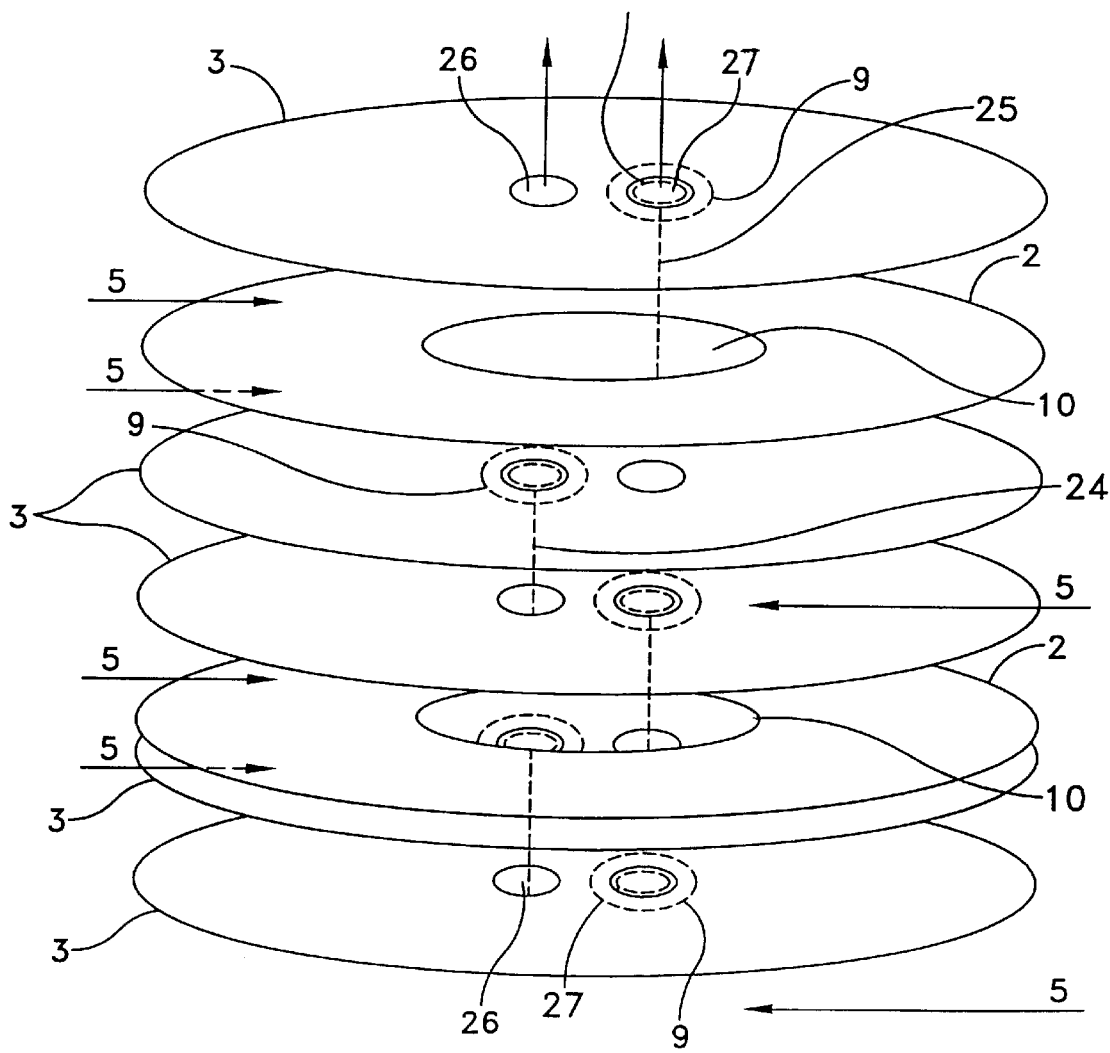
FIG. 7 is a generally schematic view of a dual-flow channel, flow-through capacitor of the invention, with a sealing agent to isolate simultaneously purified and concentrated fluid streams.
Figure 8A:
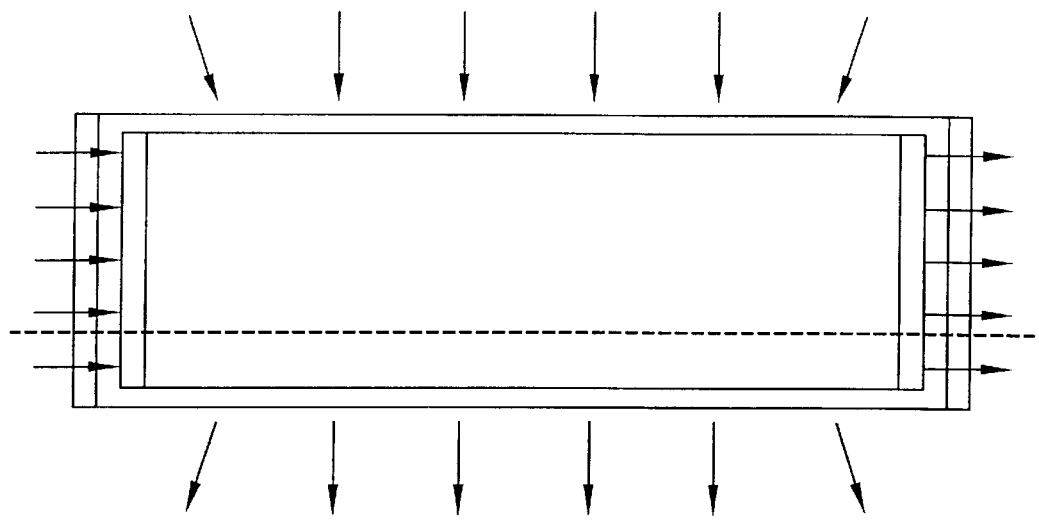
FIG. 8A is a generalized, top schematic view of the flow-through capacitor of the invention with transverse flow channels.
Figure 8B:
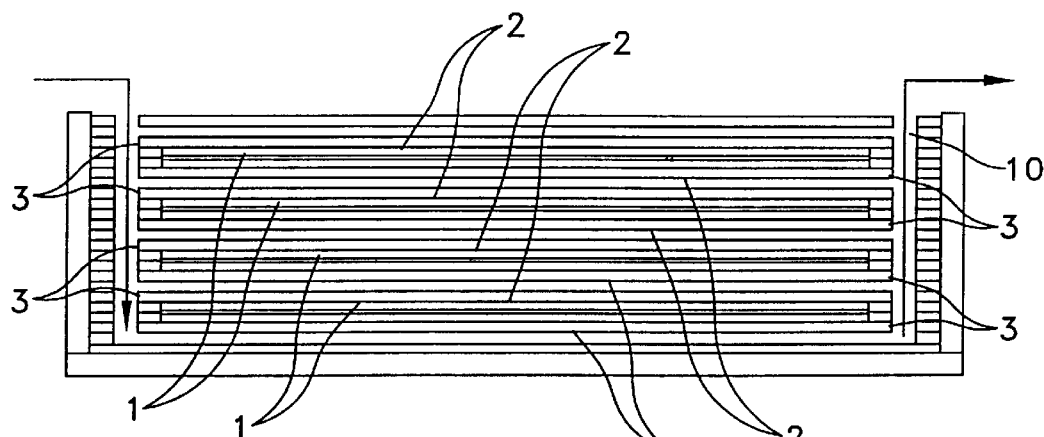
FIG. 8B is a front, cross-sectional, generalized schematic view of the flow-through capacitor of the invention with transverse flow channels.
Figure 8C:
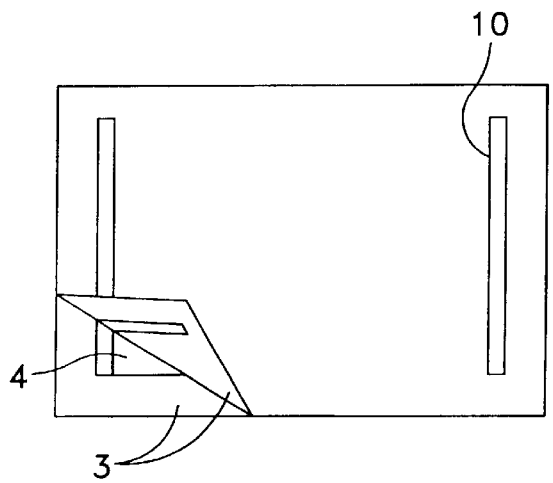
FIG. 8C is a top sectional view of the flow-through capacitor of the invention showing a charge barrier and a flow spacer.
Figure 8D:
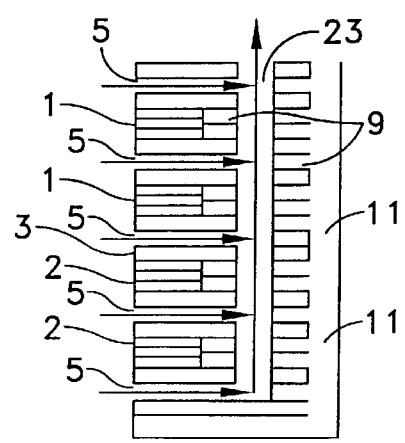
FIG. 8D is a side sectional, generalized schematic view of the flow-through capacitor of the invention with transverse flow channels.

FIG. 7 shows a layer capacitor of the invention modified so as to allow multiple flow paths 5. Charge barriers 3 are prepared with permselective membranes. Permselective membrane 3 are sealed to electrode 2 in order to form two alternating flow paths. One flow path 24 flows between pairs of permselective membranes and out flow holes 26. The other flow path 25 flows between electrode 2 and one charge barrier 3, and then out through separate flow holes 27. This capacitor has two discrete outlets formed by the seals 9 but does not require inlets to be separately sealed. Optionally, the inlets may be separately sealed in order to allow backwashing. The seal 9 may be accomplished by using, for example, a washer, gasket, glue, or resin material that seals layers together. Optionally, the electrode 2 may have an enlarged central hole 10 so that a seal need only be made between two charge barriers 3, rather than between a charge barrier 3 and an electrode 2. The layers of charge barriers 3 and electrodes 2 may be repeated within a particular cell any number of times. Typically, where the electrode 2 is an end electrode, it may be single-sided; whereas, where the electrode 2 is internal, it may be double-sided, such as on either side of a current collector 1 within the same cell.

FIGS. 8A, 8B, 8C and 8D represent a flow-through capacitor of the invention comprised of parallel rectangular layers of electrodes 2, a spacer 4, e.g., a flow spacer to allow an electronically-insulated flow channel 5, located between an electrode 2 and a seal 9, e.g., a gasket seal to form two sets of isolated, manifolded flow channels 5. The charge barrier 3 may function as, or together with, the seal 9 gasket. A flow slot 10 may be cut into one end of charge barrier 3. This forms a manifold flow channel 23 between two layers of charge barrier 3. A spacer 4, shown in the inset, may be placed between the charge barrier layers 3 in order to form a flow channel 5. Containment plate 11 is part of a cartridge holder that holds the entire flow-through capacitor cartridge formed of the layers of charge barrier 3. A second set of flow channels 5, transverse to the above flow channels 5, is formed between electrode 2 and charge barrier 3. These flow channels 5 may be formed from another set of spacers (not shown) located in this space or may be formed from a textured pattern embossed directly into either the electrode 2 or charge barrier 3. A flow channel 5 may be formed from a netting, a ribbed particulate, a microprotrusion, or a diamond-shaped pattern, e.g., a protruding or embossed pattern to form a flow channel 5. Any of the layers may contain a flow channel 5 or may be textured, or have openings, pores, or spacers to form a flow channel 5. The flow pattern may, for example, consist of 0.001 inch deep grooves in a pattern of 0.005 inch diamonds embossed in a 0.01 inch thick electrode 2. These transverse flow channels 5 are likewise manifolded together into common inlets and outlets. In this way, simultaneously-concentrated and purified fluid streams may be fed into or collected from the flow-through capacitor.

Figure 9:
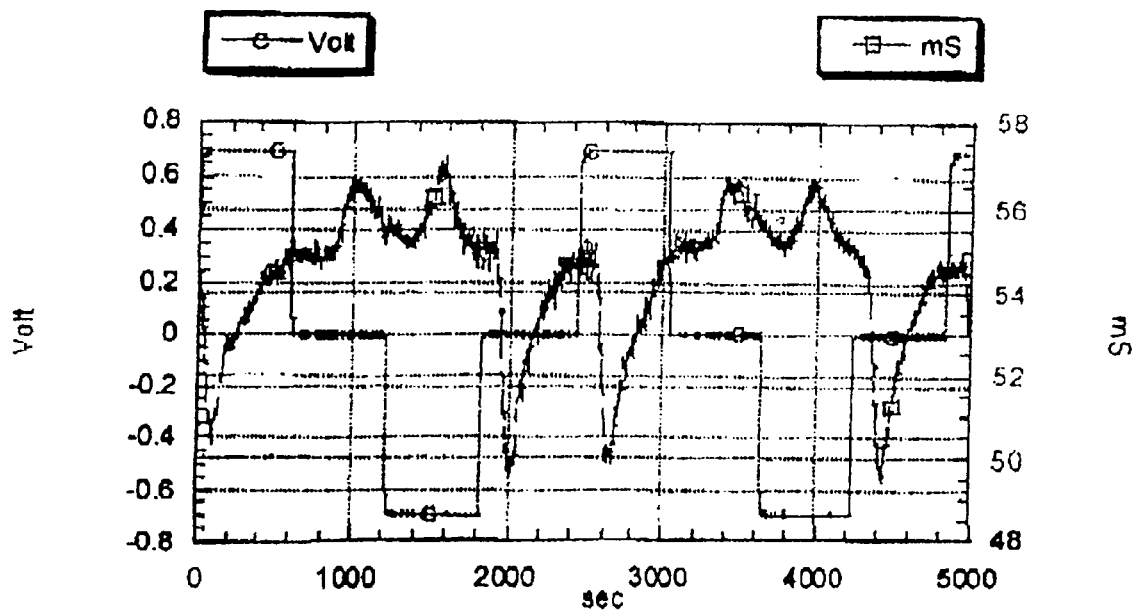
FIG. 9 shows a graph of the data generated from the flow-through capacitor of the invention when operated in cycles and is represented by charging and discharging in polarities according to the sequence depicted by FIGS. 2, 3, 4, and 5.

FIG. 9 shows a graph of the data obtained from a capacitor charged in the sequence demonstrated by charging as shown in FIG. 2, discharging as shown in FIG. 3, with the polarity of electrode 2 set so as to charge as shown in FIG. 4, and followed by discharging as in FIG. 5. Note how in this case, purification occurs upon a voltage rise, and concentration occurs upon a voltage decrease.

Figure 10:
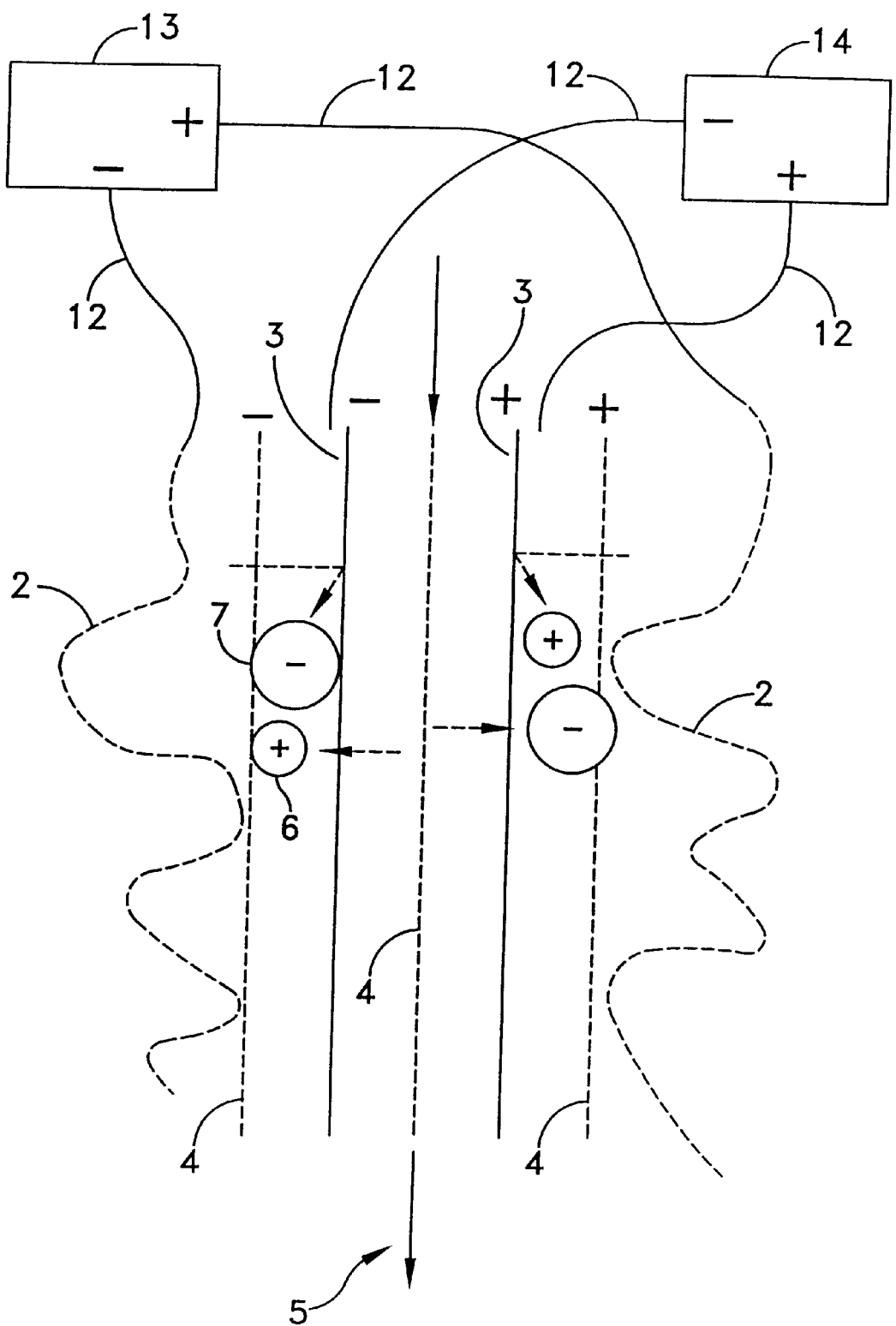
FIG. 10 is a generalized schematic diagram of the flow-through capacitor of the invention showing the attachment of conductive charge barriers to a separate DC power supply.

FIG. 10 represents an arrangement of layers of charge barriers 3 in the flow-through capacitor of the invention where the charge barrier 3 is a conductive material having a lower RC time constant than the electrode 2. The ratio of RC time constants of charge barrier 3 to electrode 2 should be more than a factor of two, and preferably, more than 4, such as, for example, 10.

Electrode 2 is connected by lead 12 to DC power source 13. The lead 12 may be integral with the electrode 2 or may be attached to a separate current collector layer (not shown), in which case the electrode 2 may be on both sides of the current collector. A spacer 4, such as an ionically-conductive, electrically-insulating spacer or a flow spacer separates the electrode 2 from the conductive, low RC time constant charge barrier 3. A separate power source 14 connects through its lead 12 to the charge barrier 3 in order to charge the charge barrier 3 to a higher, varying, or constant voltage than the underlying electrode 2. By "underlying" is meant in the direction of migration of cation 6 and anion 7. The anion 7 is held inside the chamber containing left, negative electrode 2 and spacer 4. This causes a cation 6 to migrate through the charge barrier layer 3, where it forms a concentrated solution in conjunction with anion 7. The opposite occurs on the other side of the flow-through capacitor.

Figure 11:
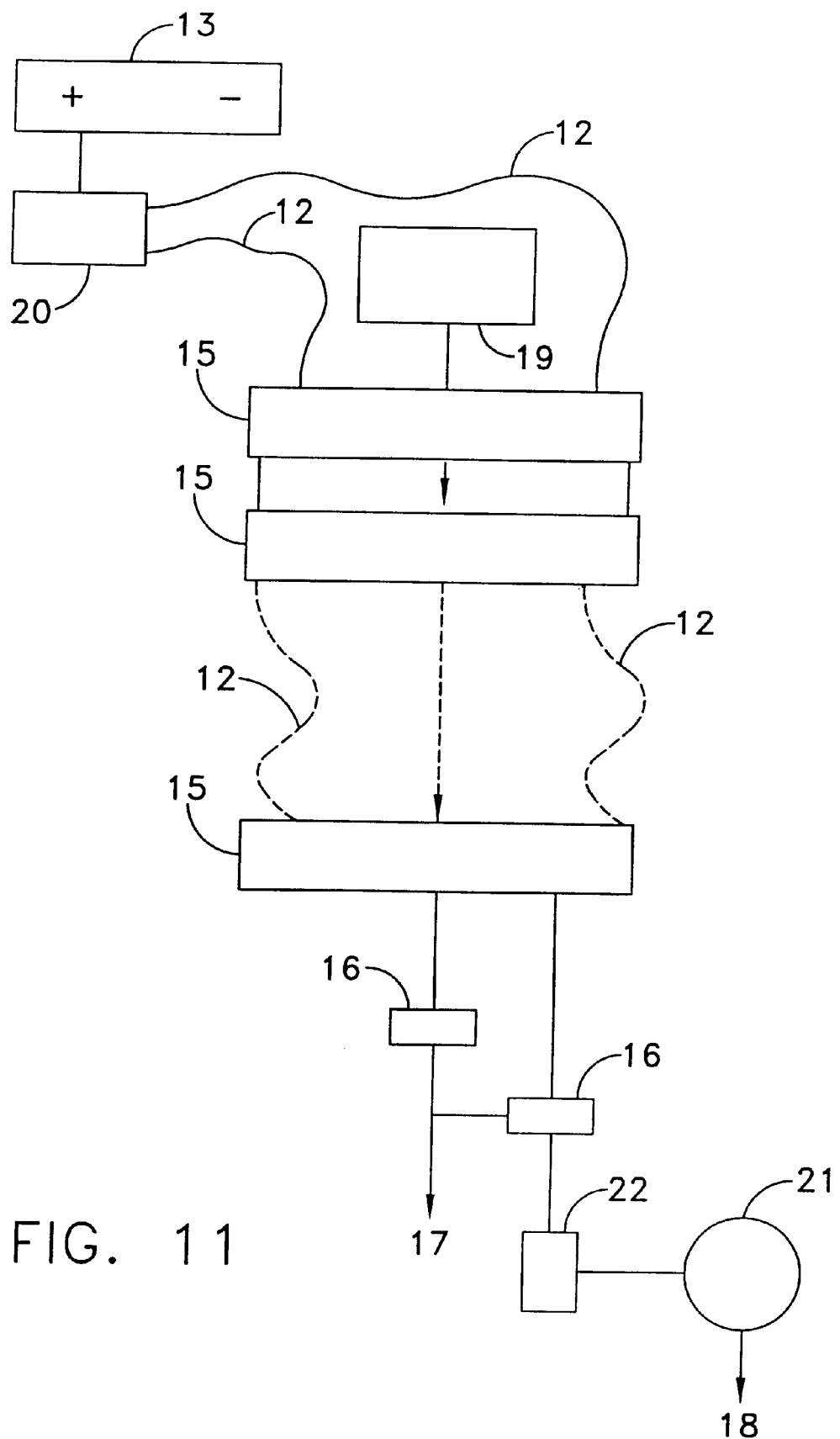
FIG. 11 is a schematic view of a flow-through capacitor system of the invention.

FIG. 11 represents a stack of flow-through capacitors 15 with separate purification and concentration streams. Flow-through capacitors 15 are fluidly and electrically connected with leads 12 in series. The DC power source 13 provides the voltage and selected constant or variable current to the capacitor 15 stack. The controller, logic, and switching instrument 20 provides alternating-polarity charge cycles and discharge cycles. Conductivity controller 22 monitors the outlet fluid concentration of purification stream 18 to provide data with which to operate logic instrument 20, and valve component 16, which switch fluid streams in order to separate waste stream 17 and purification stream 18. Optionally, the hold-up tank 21 regulates the flow in case purification stream 18 is variable or intermittent. Optionally, a component 19 may be placed upstream of the capacitors 15 to pretreat the water. A component 19, may be any technology known to treat water, for example, a component for reverse osmosis, micro or ultra filtration, carbon filtration, flocculation, electrowinning, or addition of chemicals. For example, it may be desirable to add chemicals that will presterilize the water, which chemicals may be further reduced or oxidized to a salt form by further chemical addition, then removed later in their salt form from the flow-through capacitor 15. A pretreatment component 19 may also be used for a post treatment, by placing it downstream of the flow-through capacitor in the outlet purification stream 18.

Figure 12:
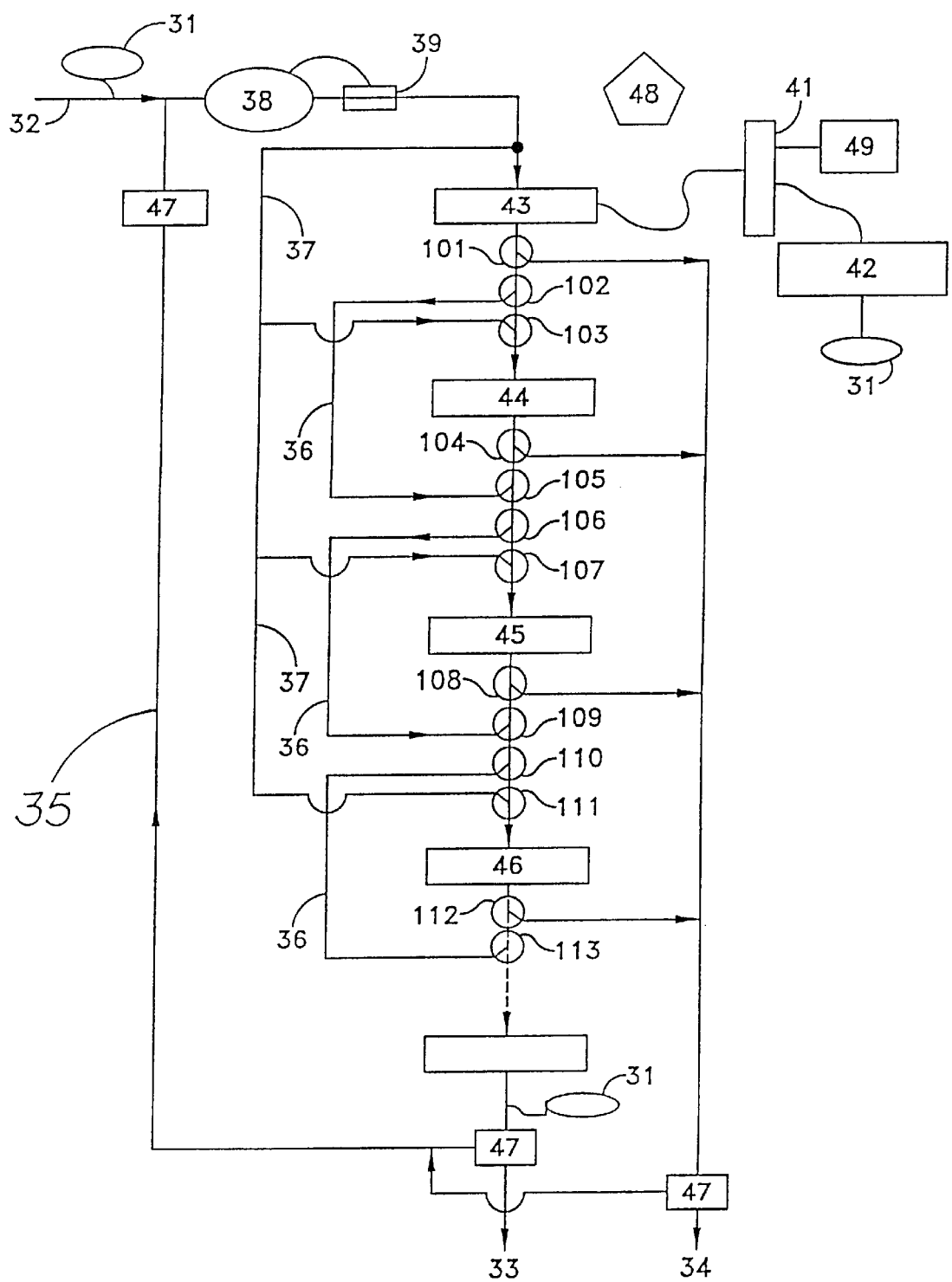
FIG. 12 is a schematic view of a flow-through capacitor system of the invention.

FIG. 12 is a schematic view of a flow-through capacitor system of the invention including: conductivity sensor and/or controller 31; feed stream 32; product water 33; wastewater 34; water recycle loop 35; cell bypass streams 36; individual cell feed or wash streams 37; pump 38; flow or pressure control and/or sensor means 39; relays 41; logic means 42; flow-through capacitor one 43; flow-through capacitor two 44; flow-through capacitor three 45; flow-through capacitor four 46; feed back valves 47; energy recovery circuit 48; power supply 49; three-way valve 101; three-way valve 102; three-way valve 103; three-way valve 104; three-way valve 105; three-way valve 106; three-way valve 107; three-way valve 108; three-way valve 109;

three-way valve 110; three-way valve 111; three-way valve 112; and three-way valve 113.

Feed stream 32 is pumped via pump 38 and optional flow or pressure controller 39 into any one or any combination of flow-through capacitors 43, 44, 45, and 46, either one at a time, in parallel, or in series flow. The number of capacitors may be any number, for example, two to two hundred. Valves, shown here as 101, 102, 103, 104, 105, 106, 107, 108, 109, 110, 111, 112, 113, work singly, together, or in combination to allow feed water to flow- through individual cells or through groups of cells, either in parallel or series flow. Alternatively, the valves may be pairs of three-way valves between each cell, or alternatively, may be replaced by any combination of two, three, four, five, or six-way (or more) valves. Preferably, a valve arrangement or combination is used that allows a particular capacitor or "cell," to be bypassed, that directs purified water and concentrated water in different directions, or that allows fluid from one cell or from a group of cells to be fed into any other cell or group of cells. Valves are used to select between the feed stream and the waste stream, to take a capacitor out of service entirely, or to feed the flow from one capacitor into another.

The system of FIG. 12 is versatile, in that at any one time, different cells may be purifying and/or concentrating waste. Therefore, continuous product and waste streams may be obtained. One or more conductivity sensors or controllers can be placed in the path of a fluid stream, in order to send a signal to logic means 42. Logic means 42 may control relays 41, so as to in turn switch polarity in particular capacitors, shunt, or charge. A capacitor may be discharged through energy recovery circuit 48, and optionally, used to charge another capacitor in order to recover the energy. Energy recovery circuit 48 may contain one or more inductor coils or may contain a DC to DC converter.

Conductivity sensor 31 can measure product water and switch water feedback valves to recycle product or wastewater through water feedback loop 35 back into the feed stream.

By recycling water in such a manner, substandard water can be selected for a conductivity sensor or timer means and fed back into the capacitor in order to minimize wastewater, minimize energy usage, and to obtain a better average product water. For example, a water quality cut off of 50% purity or better may be programmed into logic means 42 regulated by conductivity sensor 31 measurement of product water. This can be used to recycle the flow at either/or both of the beginning and the end of a purification cycle, each of which tend to be of less quality than the middle of the cycle. A timer may also suffice to select the end and beginning of a purification cycle, for example, to recycle the first and last one-third or less.

Valves 47 and 102 through 113 are optional, or may be replaced by combinations of two-way and check valves.

Logic means 42 may regulate charge and discharge cycles such that a series stack of flow-through capacitors as shown in FIG. 12 may operate without bypass streams 37, individual cell feed streams 36, or any intermediate valves 101 through 113. Bypass loop 35 and valves 47 are also optional. For operation without intermediate valves, a segment of purified water is flushed through successive capacitors in series flow. Flow rate is synchronized so that, as a segment of partially purified water reaches each successive capacitor, that capacitor's purification cycle or cycles are triggered. Therefore, each time a segment of partially purified water travels through another capacitor in series flow, it is purified more. This segment of purified water is followed by a segment of wastewater. Each time this segment of wastewater travels through a capacitor, that capacitor's concentration cycle or cycles are triggered, thereby further concentrating the waste stream as it travels through each successive capacitor. In this way, purification and concentration segments are resolved. These can be separated as they exit the last capacitor by a conductivity sensor means 31 which actuates a three-way valve that discharges waste one way and purified water another way, based upon preselected product and wastewater cut-off concentrations, for example, more than 50% purified product or more than 50% concentrated waste.

Figure 13:
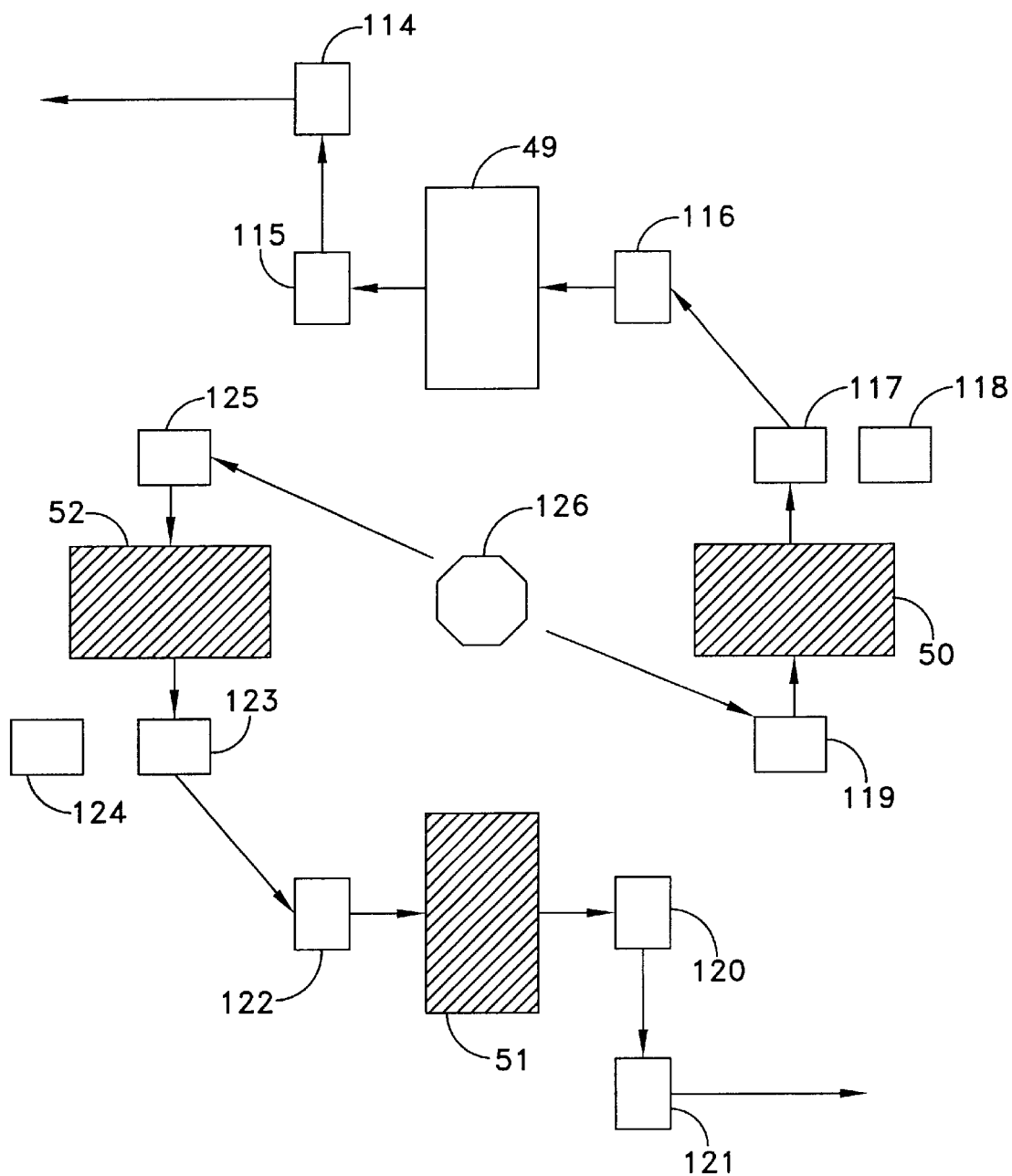
FIG. 13 is a schematic view of flow-through electrochemical cells arranged in a circular stage system.

FIG. 13 is a schematic view of flow-through electrochemical cells arranged in a circular stage system, including: flow-through capacitors or electrochemical cells 49, 50, 51, and 52; two, three, or four-way valves 114,115, 116, 117, 118, 119, 120, 121, 122, 123, 124, and 125 and manifold or valve 126.

FIG. 13 depicts a circular stage system for charge barriers in flow-through electrochemical cells, such as flow-through capacitors. Although, the system shown has four cells, it may include more cells and similar valves between the cells in order to have any number of cells from two or three cells to a hundred cells or more. The number of possible cycles are generally as many as the number of cells in the circle.

FIG. 13 depicts a four-cell system with cells 49, 50, 51, and 52, and employing four cycles. Cycle 1 is a concentration cycle, wherein the flow path is directed through cells 51 and 52 using manifold 126 and valves 120, 122, 123, and 125, with valve 121 selecting the concentrate stream to a common concentrate stream with the other cycles. Valves 115, 116, 117, and 119 direct flow-through cells 49 and 50 during their purification cycle, with the purified stream selected to a common path with subsequent cycles using valve 114.

Likewise, in cycle 2, valve combinations 115, 116, 123, 124, 125 and 117, 118, 119, 120, 122 are used. In cycle 3, valve combinations 120, 121, 122, 123 & 125 and 114, 115, 116, 117, and 119 are used. In cycle 4, valve combinations 114, 115, 116, 117, 119 and 117, 118, 119, 120, and 122 are used. These valves may be three-way valves, may be largely or entirely subtracted from the system, or may be replaced with four, five, or six-way or higher valves. Single valves, pairs, triplets, or multiples of two or three-way valves, or two-way valves combined with check valves, may also be used between each cell. It is especially desirable, in any flow-through capacitor system to recirculate slightly purified water from either the product stream, or the waste stream, or from any capacitor outlet streams, back into a capacitor inlet stream or back into the feed stream.

Concentrated waste may be recycled in order to reduce wastewater volume, for example, to less than 50% wastewater at over 50% concentrate. Both FIGS. 12 and 13 allow for continuous purification and concentration. Flows of feed, purified, or concentrated solution may flow sequentially or in parallel through capacitors. Capacitors may be connected electrically in series or in parallel. In the systems of FIGS. 12 and 13, it is possible to program or allocate a lesser proportion of time in a particular cell for concentration than for purification or vice versa. Optionally, more than one group of cells can form a continuous purification/concentration cycle at once.

Conductivity sensors are located at the feed, input, or output of any or all of the cells shown in FIG. 12 or 13. The conductivity sensor measures the input or output of a given cell. This sensor may determine when the output fluid quality has deteriorated beyond a programmed set point, or as a percentage of the input or feed, for example, output concentration is some number less than 99% compared to feed concentration. Once a set point has been reached, a signal is sent to logic means 42, which in turn activates any combination of valves 47, and 100–103, shown in FIG. 12 or sets of valves, in order to flush, remove cells from the flow path, and relays to reverse polarity or shunt a particular cell or set of cells. For example, a particular cell or group of cells can be removed from the purification flow path while being flushed with feed water in order to discharge concentrated waste. For example, valves 101 and 103 control cell 44 and can either remove it from the flow path, flush the waste into the waste stream, or direct purified water to the product stream, to an accumulation tank, or to a subsequent cell for further stages of purification. Valves 102, 103, 104, and 105 perform the same function for cell 44, shown in FIG. 12. Likewise, valves 106, 107, 108 and 109 perform this function for cell 45, and valves 110, 111, 112, and 113 for cell 46. The temporarily closed flow path between valves 125-115 and 120-119 is not shown.

Figure 14:
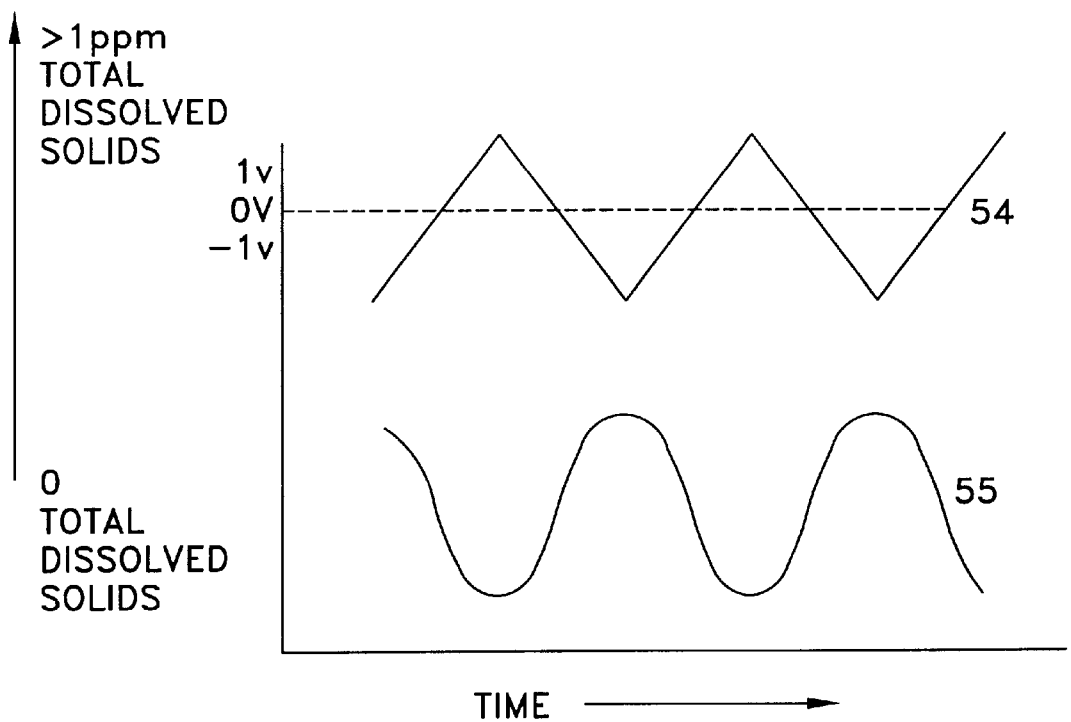
FIG. 14 is a graphical representation of a flow-through capacitor voltage and purification cycle, showing a trace of the voltage versus time as a trace of total dissolved solids, conductivity, or percent concentration and purification of dissolved materials versus time.

FIG. 14 is a graphical representation of a flow-through capacitor voltage and purification cycle, showing a trace of the voltage versus time 54 as a trace of total dissolved solids, conductivity, or percent concentration and purification of dissolved materials versus time 55.

FIG. 14 depicts a voltage cycle where voltage does not remain at the zero voltage point (as it does in FIG. 9). The corresponding purification and concentration cycles are also shown. These latter cycles may be between 0 and 360 degrees out of phase with the voltage cycles. Moreover, the decreasing voltage may be faster, or slower, or exhibit a different shape of curve or slope of line than the increasing voltage part of a particular cycle, e.g., zigzag, square, constantly accelerating, and irregular voltage patterns are possible.

Figure 15:
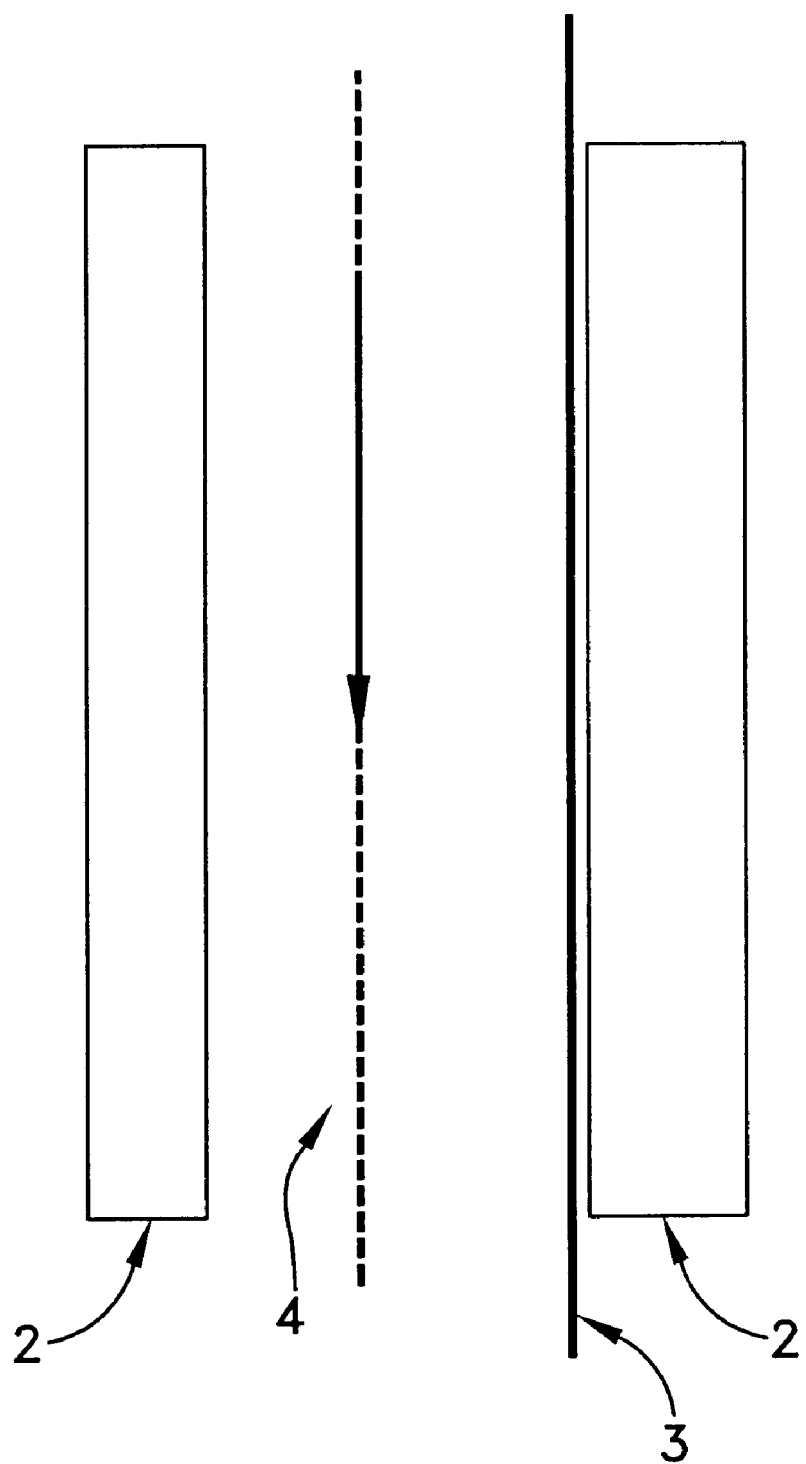
FIG. 15 illustrates a single charge barrier layer and a single flow spacer layer between two electrodes.

FIG. 15 illustrates a single charge barrier layer and a single flow spacer layer between two electrodes.

Figure 16:
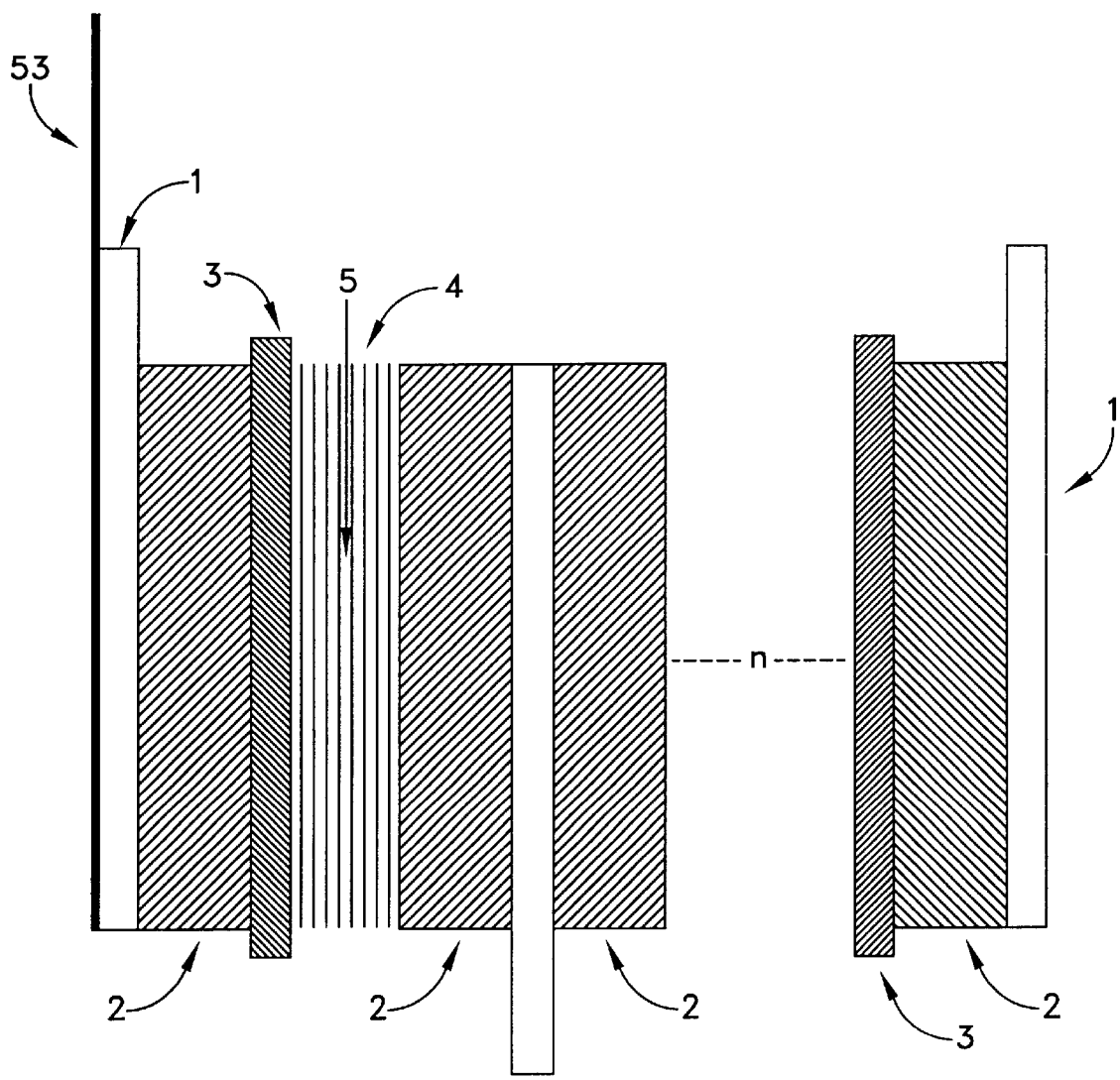
FIG. 16 illustrates a single layer charge barrier flow-through capacitor.

FIG. 16 illustrates a single layer charge barrier flow-through capacitor including: optional current collector 1; electrode 2; charge barrier material 3; flow spacer 4; flow channel 5; and an optional layer of electrically and ionically-insulating sheet material 53 to form series cells.

FIG. 16 depicts a flow-through capacitor having a single-layer charge barrier. The charge barrier material 3 can be any ion-selective or ion-exchange material. The charge barrier material may also be a chelating material with preference for particular metals. For example, the charge barrier can be a layer of loose or bound together ion-exchange particles, resin, or beads, between two layers of electrode material. The charge barrier may be a homogeneous or heterogeneous ion-exchange sheet material or, e.g., a material with either positive, negative, amphoteric, chelating, or mixtures of the above groups will serve for purposes of the invention. A preferred embodiment is an ion-exchange material with an ion-exchange capacity of over 0.01 milliequivalents per gram of material, for example, over one milliequivalent of ion-exchange capacity per gram of charge barrier material or higher. A material in the 0.01–0.2 milliequivalents per gram range may be suitable as well.

In a preferred embodiment of the invention, the charge barrier material has low resistance, decreasing series resistance losses to less than 30% of total energy losses. Charge barrier material resistance of under ten ohm $cm^2$, preferably under 3 ohm $cm^2$, is particularly desirable, for example, one ohm $cm^2$ or less. Gel water percent of less than 50% is also desirable. To achieve a low resistance, thin charge barrier materials may be used, for example, less than 0.020 inches thick, for example, 0.005 inches thick or less. Polymer materials may be applied directly onto carbon electrodes and cross-linked in place with sufficient amount of cross-linker and subsequently derivitized with ion-exchange groups in order to achieve similar properties to the above. Charge barrier materials may be a membrane, a coating, a cross-linked polymer, any of the above homogenously infiltrated into a porous electrode, or into the larger pores of a mixed pore size material. The charge barrier material may be a polyelectrolyte, hydrogel, ionomer, or membrane. Examples include methacrylic or acrylic acid with over 1% cross-linking, perflourosulfonate membranes such as Dupont NAFION™, a copolymer of styrene with, without limitation, polyvinylidene fluoride (PDVF), fluorinated ethylene-propylene (FEP), PTFE, polyolefin, or polypropylene, with the styrene groups derivitzed with ion-exchange groups, such as, e.g., sulfate or tertiary amines. A nonwoven material derivitized with ion-exchange groups is also suitable. Alternatively, the carbon of the material can be derivitized directly with ion-exchange groups to integrate the charge barrier properties with the electrode. Electrodes so derivitized may use additional charge barrier layers of any of the above-mentioned materials. Derivitization of carbon electrodes, for example, to have an ion-exchange capacity, either anion, cation, or both, of over 0.1 milliequivalent per gram, increases performance of the electrodes when used together with single or double layers of any other additional charge barrier materials.

Introduction of fluid from one cell to the next may be delayed or lagged by deliberate introduction of a lag or dead volume between cells. A lag volume of 1% or greater of a given purification cycle's volume, as measured by flow rate times cycle time, will be useful for this purpose. A conductivity sensor may trigger a subsequent cell's purification or concentration cycle once it is detected that the purified or concentrated stream from the previous cell has begun to exit the second cell. In this way, a particular cell's purification or concentration curve may be centered in the subsequent cell when the next purification or concentration cycle is initiated. Purification or concentration cycles may be two upward or downward voltage events, or may be a single upward or downward voltage event. Direction or rate of change of voltage may be adjusted, moved forward or backward in time, or shortened or lengthened in time, so that a slug of purified or concentrated water moves through successive cells with synchronous purification or concentration events, in order to purify or concentrate in stages. Closed-loop feedback control with a signal from a fluid conductivity sensor can be used to regulate and adjust voltage cycles so as to synchronize staged cells.

It may be desirable to run pairs or groups of cells at charging or discharging voltages that are out of phase, for example, between 0 and 180 degrees of phase. In addition, it may be desirable to introduce flow from one cell to another out of phase. For example, it may be desirable to introduce fluid from a subsequent cell one or more seconds after it leaves the preceding cell. In order to do this, a length or coil of tubing may be placed in the flow path in between the cells in order to deliberately introduce dead volume between the cells. An accumulation tank may also be used. However, an advantage of tubing, particular under one inch in diameter, is that tubing offers less mixing due to plug flow. Therefore, a volume of feed, concentrated or purified, solution may be fed into this excess tubing volume from one cell to the next with limited cross contamination with a following stream of different concentration. The amount of tubing may be adjusted according to flow rate to accommodate sufficient dead volume in order to create a lag period of flow between cells of any length of time. This lag period is in order to give the subsequent cell to wash out its purified, concentrated, or feed water solution prior to triggering a rising or declining voltage cycle that initiates concentration or purification in that cell.

Current Control

One advantage of a charge barrier cell is that conductivity may mirror or directly follow current. This may be used as a means of deliberately controlling and monitoring output cell water purification or concentration. For example, current, in amps, may be plotted versus concentration or purification as measured by the conductivity meter in milliSiemens or other units. This gives lines or curves of current versus time, or of conductivity versus time, or versus voltage, for both amperage and conductivity of the solution. These lines or curves may be curve fit and correlated to find an equation or constant slope, which may be used to interpolate or predict and/or control output concentration for any given amperage charging or discharging the capacitor. The slope of the line may be used to program a logic device used to control product or wastewater output. For example, if water concentration surpasses or exceeds a desired set point, for example, more than 50% purified or more than 50% concentrated in relation to the feed stream concentration, a logic means may utilize the above program or algorithm to regulate the output. For example, if it is desired to maintain water product more than 50% purified, and the product falls below this threshold, current through the capacitor, either discharge current or charging current, may be increased. A steadily increasing current may therefore be used in order to extend the cycle time within which a desired water quality is produced. If water quality exceeds a certain threshold, current may be decreased based upon the above formula. This method works on the waste end as well as the purification end, so that wastewater is not concentrated enough, current may likewise be increased. If wastewater exceeds a desired threshold concentration, charge or discharge current through the capacitor may be decreased. Each concentration, fluid, and voltage may have its own formula and may be measured and preprogrammed. A capacitor system may contain a memory means in order to store this information for input into a program which learns from this information and uses it to control purification functions. Purification and concentration cycles may lag, mirror, or be inverted from the current cycles. A lag may be caused by the deliberate introduction of dead volume, accumulation or bladder tanks, or lengths of tubing or pipe.

The charge curve need not contain a shunt cycle. Polarity may be directly reversed from a charged state.

Voltage Control

The charge barrier flow-through capacitor purifies or concentrates upon a change in voltage. Unlike previous flow-through capacitors, a shunt, a period of time for a zero voltage cycle, is optional and not necessary. For example, it is possible to go from a minus voltage, through zero, to a positive voltage, for example, between −1.2 and 1.2 volts, without pausing at zero volts. This gives a triangular voltage cycle 54 that correlates with a conductivity cycle 54. Conductivity 54 may be between 0 degrees and 360 degrees out of phase with voltage 54. FIG. 14 depicts such a charge barrier flow-through capacitor with such a voltage cycle. Voltage increase or decrease does not have to be linear. Alternatively, the change in voltage may follow any exponential, quadratic, logarithmic, elliptical, circular, trigonometric, sinusoid, or other mathematical formula. This formula may be programmed into and controlled by a logic means, which regulates the power and relays that reverse polarity. FIG. 14 demonstrates purification upon a rising voltage and concentration upon a decreasing voltage. Purification and concentration are relative to a given feed stream, and may be, for example, 10% to 90%, or 99% or greater, purification or concentration, and over two-fold concentration. The rate of change of voltage is typically more than 0.05 millivolts per second for purification, and typically varies between −2 and 2 volts, or multiples of this for each cell in a series stack. The rate of change of a particular individual cell voltage for concentration may be increased relative to the purification rate of voltage change, for example, more than 1 or 2 times faster, in order to minimize wastewater.

To minimize energy and water losses, it is often important to rinse the wastewater from the flow-through capacitor of the present invention into water at the same or higher concentration as the feed solution. However, this causes carryover of contaminated water. In order to allow purification of more than 50% compared to the feed solution, the molar or mass ratio of wash or concentration cycle carryover ions per ions removed in a subsequent purification cycle must be less than 1. A preferred means of achieving this is a charge barrier flow-through capacitor of the present invention with greater than 3 farads per each milliliter of dead volume. Dead volume is defined as the geometrically-calculated volume taken up by all the flow channels and flow spacer within the charge barrier flow-through capacitor cell, cartridge holder, and any connecting tubes, tanks, or piping. An alternative method to eliminate ion carryover from concentration cycle to purification cycle is to use plug flow in order to wash the carryover concentration cycle out through the cell prior to a sequent purification cycle. In order to do this, the flow spacers used are selected for good rinsing properties with little carryover. Hydrophobic spacers, open channel, or net spacers may be used. Alternatively, air may be used to rinse out the cell between purification cycles. Excess wastewater may also be mechanically or hydraulically squeezed out.

Suitable means for performing logical functions, or logic instruments, are known to those skilled in the art, including without limitation: computers, processors, one or more communicating central processing units, calculators, or instruments programmed or otherwise equipped to perform algorithmic or logical functions, or similarly equipped robotics or human intermediaries.

The flow-through capacitors of the invention may be utilized in any system configuration common to ion exchange, electrodialysis, or reverse osmosis, or flow-through capacitors, including bleed and feed, batch, or continuous processes.

Flow-through capacitors, including the charge barrier flow-through capacitor of the present invention, may be configured as a removable or disposable capacitor cartridge with the same cartridge and cartridge holder geometries as any carbon block, microfiltration, reverse osmosis, or any other water filtration technology. Graphite or water-isolated, metallic electric lead means extend from the capacitor cartridge to or through the cartridge holder and thence to the electronics and power supply.

EXAMPLES

Example 1

The flow-through capacitor of FIG. 10 is prepared using electrodes composed of 95% carbon black and 5% of a polymer PTFE or similar polymer. Charge barriers are composed of permselective membranes. In the capacitor of FIG. 10, a cation exchange membrane, such as RAIPORE™ 1010 membrane with fixed benzyl sulfonic acid groups, is placed touching and adjacent to the negative electrode. An anion exchange membrane, in this case, a RAIPORE™ 1030 membrane with fixed phenyl tetramethyl ammonium groups, is placed touching and adjacent to the positive electrode. A 0.003 inch thick filtration netting is placed between the two oppositely-charged permselective membranes and to form the flow path. The capacitor is charged at constant current, up to a voltage limit of 1 volt. Seawater flowing between the membranes is purified to 12%. In order to reach a purity of 99%, several capacitors are used in series or stages with series flow to reduce the salinity to 6000 ppm. An additional flow-through capacitor, e.g., a reverse osmosis series stage may be used to further reduce the remaining salinity to 250 ppm.

Example 2

The flow-through capacitor of Example 1 is used at a flow rate of less than 1 ml/minute/gram of carbon, for example, 0.1 ml/minute/gram of carbon, to achieve greater than 90% purification of a 35,000 ppm salt solution.

Example 3

The flow-through capacitor of Example 1 is coupled through an inductor in order to recover energy during discharge. This energy is used to charge a second capacitor during its purification cycle. Maximum charging voltage of both capacitors is kept below 0.7 volts, in order to minimize energy usage. Capacitors may be charged either at constant voltage, constant current, or at constantly increasing voltage, or constantly increasing current. Optionally, capacitors may be charged in series in order to increase the voltage for maximum energy recovery and power supply efficiency.

Example 4

The flow-through capacitor of FIG. 11 is made by using activated carbon black as the electrodes. A low RC time constant material, such as carbon fibers, nanotube mesh, or low capacitance activated carbon cloth aerogel is used as a charge barrier material. Water with 5000 ppm minerals and salts is passed through this device at a flow rate of less than 20 ml/minute per gram of carbon, with the flow rate adjusted downwards in order to achieve 95% purification. The flow rate may be further decreased into the charge cycle in order to maintain the desired level of purification for a longer period of time. Once the level of purification drops below 80%, the capacitor is discharged through an energy-recovery circuit. That energy is added to the energy from the DC power source and used to charge another capacitor which purifies while the first capacitor is releasing a concentrated stream of contaminants.

Example 5

The flow-through capacitor of Example 4 may be powered by a fuel cell.

Example 6

A flow-through capacitor is made utilizing low surface area carbon black, in the range between 300 and 900 Brunauer Emmett Teller method (B.E.T.), selected for being less likely to passively adsorb contaminants and therefore foul the flow path. The charge barrier materials are NEO-SEPTA®. The flow arrangement is a dual-flow channel device as shown in FIGS. 7 and 8A, 8B, 8C, and 8D. One flow channel is formed between and by spacing apart the two charge barrier materials. A pair of side flow channels is located on either side of the central flow channel. These side flow channels are also formed by placing a spacer between the electrodes and the charge barrier materials. A membrane that selectively allows anions to migrate through it (anion permselective, because it has bound positively-charged ionic groups), is initially placed on the side of the negative electrode, with a flow spacer in between. The membrane that selectively allows cations to migrate through it (cation permselective, because it has bound negatively-charged ionic groups). During this charge cycle, purified water is retrieved from the outlet of the central flow channel. Simultaneously, concentrated water is retrieved from the electrode facing side flow channels.

The same flow-through capacitor may subsequently be discharged. A concentrated solution is recovered from the central flow channel. The capacitor may be repeatedly run in this polarity sequence. Alternatively, the polarity may be reversed. Reversing the polarity places the permselective membranes adjacent to the oppositely-charged electrodes. This means that a concentrated stream is recovered during the charge cycle from the central flow channel. Simultaneously, a purified stream may be recovered from the side flow channels. Subsequently, the flow-through capacitor may be discharged. During the discharge cycle, a purified liquid is recovered from the central flow stream, and a concentrated liquid is recovered from the side flow channels.

Example 7

A flow-through capacitor is made utilizing one micron small particle size activated carbon powder electrodes bound together with 5% PTFE binder. The charge barrier material is a conductive polymer coating 0.001 inch thick. Ten of the charge barriers are connected in a 7-volt series bank of capacitors. Seawater of 35,000 ppm is treated to 500 ppm at an energy usage of 0.7 joules per coulomb. 70% of the energy is recovered during discharge of the capacitors using inductive coils to recharge a second bank of capacitors in series.

Example 8

In a flow-through capacitor using edge plane graphite with a surface area of 500 square meters per gram for electrodes, an anion and a cation exchange membrane are used as charge barriers. An additional pair of bipolar membranes is placed between the cation or anion membranes and the electrodes. Flow spacers are placed between all the above layers, or merely between the cation and anion exchange membranes. The resulting cell may be used in any application of bipolar membrane electrodialysis, but without oxidation reduction reactions at the electrodes, for example, recovery of organic acids, proteins, or biological molecules from fermentation broths. Another application is the recovery of $SO^2$ or $NO^3$ from stack gas.

Example 9

A flow-through capacitor is made using an electrode composed of a high-capacitance electrode material, such as high-surface-area carbon cloth, or edge plane graphite, or carbon black particles bound together with fibrillated PTFE. Membranes selective for transmigration of cations and anions, respectively, are placed touching the electrodes. A central flow channel is formed by any spacing component, including biplanar filtration netting under 0.01 inches thick, screen-printed protrusions or ribs, or membranes textured with premanufactured flow channels in a diamond pattern. The initial charge sequence is at constant current selected for low I squared R energy losses, where "I" is amps and "R" is electrical series resistance. A top charging voltage of 0.6 volts is selected to minimize the amount of energy required to purify a given amount of ions. The charge cycles are carried out as follows:

During the first charge cycle, the electrodes are of the same polarity as the fixed charge inside the membranes. Coions expelled from the pore volume of the electrodes are trapped against the membranes. This causes an amount of counterions in the central flow channel to migrate through the membranes, where they form a concentrated solution in the electrode layer. This counteracts the losses ordinarily caused by adsorption and expulsion of dissolved pore volume salts. Therefore, the ionic efficiency, as measured by coulombs of ionic charge purified divided by coulombs of electronic charge utilized, is greater than 30%. In this case, for 35,000 ppm salts, ionic efficiency is 85%, and the energy utilized is 0.35 joules per coulomb of charge.

The next cycle is a discharge cycle in which concentrated waste is released into a feed stream fed into the central flow channel and recovered from the outlet. The next cycle, after discharge, is a reverse polarity charge. Here, the bound charge on the membranes is opposite to the electronic charge on the electrodes. Ions are driven from the electrode across to the adjacent membrane, but cannot migrate through the second membrane. Therefore, a concentrated solution forms in the central flow channel and is released through the outlet. Upon discharge from this polarity, ions migrate from the central flow channel back into the electrode chambers, thereby purifying the feed stream. The subsequent cycle goes back to the beginning. These cycles can be repeated as many times as desired. An example of data from the above is shown in FIG. 9. FIG. 9 shows the underlying usefulness of the charge cycle in Example 7. Note that two purification cycles occur in a row. Likewise, two concentration cycles occur in a row. This doubling up of purification or concentration artificially extends the length of time the capacitor is performing a particular purification or concentration cycle.

Example 10

The flow-through capacitor of FIG. 11 is used to make ultrapure water of, e.g., 18 megaohms cm. The water may be pretreated using one or more of a microfilitration unit, a water softener, and followed by a reverse osmosis unit. The water may be post treated using, e.g., a polishing bed of deionization resin. The flow-through capacitor removes some or all of the dissolved solids from the deionization bed, thereby prolonging the lifetime of the deionization bed.

Example 11

The flow-through capacitor of FIG. 11 may be used to post-treat seawater which has been previously treated by reverse osmosis. The salinity of the seawater is initially reduced by reverse osmosis from 35,000 ppm to 10,000 ppm. Subsequently, treatment with the flow-through capacitor further reduced the salt concentration to 250 ppm. The combined use of reverse osmosis and the flow-through capacitor desalinated seawater for 15 kw hours per thousand gallons, which is a 30% energy savings compared to using reverse osmosis alone.

Example 12

The flow-through capacitor of the invention may be used to purify seawater to 500 ppm.

Example 13

Individual flow-through capacitor cells are made with the following sequence of layers: current collector layers, such as using 0.005 inch thick graphite foil; an electrode layer of any capacitance material, for example, carbon microparticle containing sheet material; a pair of charge barrier layers consisting of carbon cloth or of an anion and a cation exchange membrane bracketing a central flow netting spacer of 0.005 inch thick polypropylene; a second electrode layer needed to form a pair; and a second current collector layer. The current collectors are ionically insulating but electronically conductive. Therefore, if a number n of the above sequence of layers are stacked up as flat sheets, or rolled in concentric spirals, they will form a series-connected, flow-through capacitor with single-sided capacitive electrodes facing outwardly from the current collector. The current collector forms the ionically-nonconductive boundary between cells and establishes an electrical series connection. If the electrode is conductive enough not to require a current collector, then a thin sheet of plastic may be used as long as series leads are connected between cells. The electrode does not need to be single-sided. Any number of double-sided electrodes connected electrically in parallel may exist within particular cells. Each cell may be made with the same capacitance by matching the construction of each cell. Flow in the spiral cell may be alongside the layers.

Example 14

Activated carbon particles in the 0.2 to 5 micron diameter range, conductive ceramic, aerogel, carbon black, carbon fibers, or nanotubes with a BET of between 300 and 2000, are mixed together with 5% PTFE binder, ion exchange resins as a charge barrier, and carboxymethylcellulose as a plasticizer, and calendered into a 0.01 thick sheet. These are made separately in anion, cation, and bipolar versions. Any ion exchange resin known to be used in ion exchange or electrodialysis membranes may be used. Ion exchange groups include any strong or weak acid or base, for example, sulfonic acid or amine groups. Ionic group support material includes any material used in ion exchange or membranes, including fluorinated polymers, divinylbenzene, or styrene polymers, or any other kind of polymer, zeolite, or ceramic material. The geometry of construction will be known to those of skill in the art, including, but not limited to those described in the U.S. Pat. Nos. 5,192,432, 5,415,768, 5,538,611, 5,547,581, 5,620,597, 5,748,437, 5,779,891, and 6,127,474, each hereby incorporated by reference in its entirety. The electrodes may be spaced apart or provided with a flow spacer and an optional current collector in order to form a charge barrier flow-through capacitor. The advantage of this example is that the charge barrier material is evenly distributed throughout the electrode layers, thereby eliminating extra charge barrier layers, the cost due to these extra parts, and allowing the electrodes to be spaced closer together, less than 0.02 inches, for example, which cuts resistance and increases flow rate of purification. Monolithic or sintered carbon electrodes may also be used, for example, electrodes with honeycomb holes incorporated into the structure may have these holes filled in with ion exchange resin to effect a combined charge barrier electrode material.

Example 15

In one embodiment, a charge barrier flow-through capacitor may be prepared as follows:

Pairs of carbon electrode material consisting of a fibrillateable PTFE carbon powder mixture in the ratio of under 5–15% PTFE, and 95–85% carbon is used as an electrode. The powdered carbon is any high capacitance carbon with a single electrode capacitance of over 10 farads per gram as measured in 0.6 M KCL, for example, activated carbon powder with particle size less than 100 microns and surface area of 1000 square meters per gram as measured by the B.E.T. method. The end electrodes may be single-sided. Intermediate electrodes may be double-sided, may have a single side of high capacitance material and a side of graphite current collector, which may be made with open area more than 10%, openings or pores to facilitate ion transport through the current collector so that ions conduct into both sides of the high capacitance layer, or, high capacitance layers may be on either side of an optional current collector, such as a layer of graphite. This layer of graphite may be applied with a binder and integral with the electrode, or be a separate piece of graphite foil, for example, under 0.020 inches thick. Graphite may be easily mixed with a binder and directly applied to carbon electrode sheet material via rollers, doctor blades, spraying, or any coating method directly onto the carbon electrode in order to form an integral current collector. If necessary, binders are sintered subsequently or heat-treated in order to cure or drive away nonconductive or toxic components.

A single polarity charge barrier material in contact with one of the pair of electrodes form the anode and cathode layers of the capacitor of the present invention. In this example, a porous polymer or polyolefin membrane with acrylic acid, amine, sulfate, chelating, azide, cynanide, carboxyl, super absorbent polymers, surfactants, any cationic, anionic, zwitterionic groups, including sulfonic acid, quaternary amine, amine, phosphate, cynanide, or trimethylbenzylammonium groups.

For single-sided charge barrier flow-through capacitors, layers of material may be put together in the order of electrode, charge barrier, flow spacer, and electrode. A double-sided charge barrier capacitor includes an extra charge barrier layer of the same or opposite polarity from the first, placed between electrode layers. All layers may be repeated any number of times. Electrodes may have an optional current collector and be single or double-sided with the current collector in the middle of two carbon sheets. A flow spacer is optional and may be any net, woven, meltblown, spun-bound, nonwoven, or particle material, preferably less than 0.03 inches thick. One preferred embodiment is to eliminate a separate flow spacer and to form the flow channel 5 shown in FIGS. 2 and 15 by texturing either one or both of any two facing layers, for example, an electrode and charge barrier layer, two electrode layers, or two charge barrier layers. Grooves may be made directly into either of these layers. When one or two grooved electrodes, electrode and charge barrier, or double charge barrier layers are placed together with the grooves offset at an angle, biplanar flow channels form as a result. This eliminates a separate flow spacer layer, decreased distance between electrodes to under 0.03 inches, and thereby eliminates electrical series resistance to under 150 ohms cm$^2$ as measured in 0.6 M KCL. The cm$^2$ above refers to the total facing area between all the electrodes.

The above layers may be laminated together in order to integrate electrodes with charge barriers and flow spacers. Charge barriers and current collectors may also be used to form gaskets in order to separate multiple or single electrode electrical series cells. A nonconductive sheet material, 53 in FIG. 15, may similarly be placed between numbers of electrode layers in order to electrically isolate series capacitors. Material 53 may be a plastic or polymer sheet material or any ionically and electrically-insulating material. Electrical insulator material 53 may be used, in double as well as single-sided charge barrier flow-through capacitors. If similar lengths or amounts of electrode material are used in each series cell, voltage will divide evenly between the cells in the series stack. A series stack may be formed by spiral-winding equivalent amounts of material per series cell. Each cell in the series will be formed in a concentric manner around a central axis or spindle. In cross section, each series cell may need to form a thinner concentric layer in order to maintain a similar amount of material per cell as the radius of the cylinder increases. The ends of this spiral-wound series cell may be sealed completely with resin or mechanical means, leaving inlet and outlet holes for flow paths into and out of the each end for each cell, or, the ends may be placed less than one-half inch away from a cartridge holder or end plate, in order that the electrical flow path between series cells is over one ohm resistance, while maintaining parallel fluid flow paths. Alternatively, flow path may also be in series, in which case, flow may be serpentine from one cell to the next.

It may be desirable to manufacture series cells of up to twenty cells in series. These series cells may be in turn grouped together into higher series totals. Electronic monitoring and control means may be inserted between each series cell stack or group in order to ensure that voltages continue to balance within 50% from cell to cell, preferably within 10%. It is also desirable to manufacture series cells with multiple leads from each cell, so that the cells may be individually shunted and brought to zero volts.

Example 16

A charge barrier flow-through capacitor is used with a solution of over 10 ppm at a flow rate of less than 5 ml/minute/gram of carbon to as low as 0.1 ml/min/gram carbon in order to obtain a product solution of 90% to more than 95% purified at a voltage of voltage which varies between −1 and +1 volt every 1000 seconds or less, or less than 1 millivolt per second. If desired to achieve low wastewater, the voltage variation during the concentration part of the cycle may be increased to change at a rate of more than 1 millivolts per second. Purification or concentration may be upon either a rising or a falling voltage, depending upon the polarity of the cell or power supply connected to the cell.

What is claimed is:

1. A flow-through capacitor comprising:
    (a) a plurality of electrodes comprising an electrode material having a surface area for electrostatic adsorption of feed ions;
    (b) a pore structure in one or more of said plurality of electrodes, whereby said electrode is a porous electrode having a pore volume; and
    (c) a first charge barrier material different from said electrode material, located adjacent to said electrode.

2. The flow-through capacitor of claim 1, wherein the charge barrier material is characterized by low resistance-capacitance.

3. The flow-through capacitor of claim 2, wherein the charge barrier material is an electrically-conductive membrane with a low resistance-capacitance (RC) time constant.

4. The flow-through capacitor of claim 3, wherein the capacitance of the charge barrier material is less than 20 farads/gram.

5. The flow-through capacitor of claim 1, wherein at least one of the electrodes is an anode and at least one of the electrodes is a cathode.

6. The flow-through capacitor of claim 5 comprising a first electric field that is between said anode and cathode, and further comprising a second electric field that is within said electrode and inverse to said first electric field.

7. The flow-through capacitor of claim 1, wherein the charge barrier material comprises a first semipermeable membrane.

8. The flow-through capacitor of claim 7, wherein said flow-through capacitor further comprises a second charge barrier material semipermeable membrane, said first membrane being a cation exchange membrane and said second membrane being an anion exchange membrane.

9. The flow-through capacitor of claim 8, wherein the anion exchange membrane is proximal to an anode, and the cation exchange membrane is proximal to a cathode.

10. The flow-through capacitor of claim 9, wherein the locations of the anion and cation exchange membranes relative to the electrodes are reversed by reversal of voltage polarity on the electrodes.

11. The flow-through capacitor of claim 8, wherein the electrode is operated in the charge cycles of opposite polarity, separated by discharge cycles.

12. The flow-through capacitor of claim 7, further comprising a second charge barrier material membrane, wherein the charge barrier membranes are identically-charged semipermeable membranes, selected from the group consisting of cation exchange membranes and anion exchange membranes.

13. The flow-through capacitor of claim 1, further comprising a flow channel.

14. The flow-through capacitor of claim 13, wherein the flow channel is formed by a spacer.

15. The flow-through capacitor of claim 13, wherein the flow channel is located between one of the electrodes and the first charge barrier material.

16. The flow-through capacitor of claim 15, further comprising a second charge barrier material and further comprising a flow channel located between the first and second charge barrier materials.

17. The flow-through capacitor of claim 1, wherein the charge barrier material is electrically connected to a first power supply, and at least one of the plurality of electrodes is electrically connected to a second power supply.

18. The flow-through capacitor of claim 1, wherein the charge barrier material has a voltage and one or more electrodes of said plurality of electrodes has a voltage, the charge barrier voltage being greater than the electrode voltage.

19. The flow-through capacitor of claim 1, wherein the flow-through capacitor comprises a series resistance of less than 50 ohm cm$^2$.

20. The flow-through capacitor of claim 1, wherein the flow-through capacitor has a series resistance to leakage ratio of greater than 100.

21. The flow-through capacitor of claim 1, wherein the electrodes within a cell of the capacitor are ionically insulated and connected electrically in series.

22. The flow-through capacitor of claim 21, further comprising a flow path adjacent to each of the electrodes.

23. A system comprising the flow-through capacitor of claim 1 and a valve.

24. The system of claim 23, wherein said valve is a feedback valve.

25. The system of claim 23, wherein said valve is a three-way valve.

26. The system of claim 23, comprising a means for allowing fluid in said system to bypass a flow-through capacitor in said system.

27. The system of claim 23, comprising a means for directing fluid in said system from said flow-through capacitor to a second flow-through capacitor in said system.

28. The system of claim 23, further comprising a means for monitoring the concentration of ions in a fluid in said system.

29. The system of claim 23, further comprising a means for controlling the concentration of ions in a fluid in said system.

30. The flow-through capacitor of claim 1, wherein said first charge barrier material is a laminate coating on said electrode material.

31. The flow-through capacitor of claim 30, wherein said laminate coating is an ion exchange material.

32. The flow-through capacitor of claim 30, wherein said laminate coating is characterized by a low-resistance capacitance (RC) time constant.

33. The flow-through capacitor of claim 1, wherein said first charge barrier material is a conductive polymer sheet material.

34. The flow-through capacitor of claim 1, wherein said first charge barrier material is material selected from the group consisting of a fibrous material, a woven material, and a mesh material.

35. The flow-through capacitor of claim 1, wherein said first charge barrier material is an aerogel.

36. The flow-through capacitor of claim 1, wherein said first charge barrier material is a hydrogel.

37. The flow-through capacitor of claim 1, wherein said first charge barrier material is selected from the group consisting of a carbon powder material and a graphite material.

38. The flow-through capacitor of claim 1, wherein said first charge barrier material infiltrates said at least a portion of said pore volume of said electrode to form a combined electrode charge barrier material composite.

39. The flow-through capacitor of claim 1, wherein said flow-through capacitor comprises a plurality of ion-depleting and ion-concentrating compartments.

40. The flow-through capacitor of claim 1, wherein said first charge barrier material is an ion-exchange resin.

41. The flow-through capacitor of claim 1, wherein said first charge barrier material is an evenly distributed throughout said electrode material of one or more of said plurality of electrodes.

42. The flow-through capacitor of claim 1, wherein said charge barrier material comprises one or more bipolar membranes.

43. The flow-through capacitor of claim 1, wherein said flow-through capacitor has an ionic efficiency of at least 30%.

44. The flow-through capacitor of claim 1, wherein said flow-through capacitor has an ionic efficiency of at least 70%.

45. The flow-through capacitor of claim 1, wherein said adjacent charge barrier material is within the pore structure of the electrode.

46. The flow-through capacitor of claim 1, wherein said adjacent charge barrier material is infiltrated into the pore structure of the electrode.

47. The flow-through capacitor of claim 1, wherein said adjacent charge barrier material is a coating layer.

48. The flow-through capacitor of claim 1, wherein said adjacent charge barrier material is a membrane layer.

49. The flow-through capacitor of claim 1, wherein said charge barrier material has a porosity of less than 10%.

50. The flow-through capacitor of claim 1, wherein said first charge barrier material has an ion exchange capacity of over 0.01 milliequivalents per gram.

51. The flow-through capacitor of claim 50, where said adjacent charge barrier material is infiltrated into the pore structure of said porous electrode, said charge barrier material selected from the group consisting of an ion exchange polymer and a hydrogel.

52. The flow-through capacitor of claim 50, where said adjacent charge barrier material is a coating blocking the pore volume of said porous electrode, said charge barrier material selected from the group consisting of an ion exchange polymer and a hydrogel.

53. The flow-through capacitor of claim 1, wherein said pore volume contains pore ions and said electrode has a ratio of feed ions to pore ions, and wherein said first charge barrier material increases the ratio of feed ions to pore ions in said electrode.

54. The flow-through capacitor of claim 1, wherein said flow-through capacitor has an energy usage of less than 1 joule per coulomb of ionic charge purified.

55. The flow-through capacitor of claim 1, wherein said flow-through capacitor has an energy usage of less than 0.5 joule per coulomb of ionic charge purified.

56. The flow-through capacitor of claim 1, wherein said flow-through capacitor has an ionic efficiency of greater than 50% in the presence of a feed stream having an ionic concentration of at least 2500 parts per million.

57. The flow-through capacitor of claim 56, wherein said feed stream has an ionic concentration of at least 6000 parts per million.

58. The flow-through capacitor of claim 1, wherein said flow-through capacitor further comprises a current collector.

59. The flow-through capacitor of claim 1, wherein as least one of said plurality of electrodes is a double-sided electrode.

60. The flow-through capacitor of claim 59, wherein said flow-through capacitor further comprises a current collector.

61. A flow-through capacitor comprising:
(a) a plurality of electrodes; and
(b) a first charge barrier located between two of said plurality of electrodes, wherein the charge barrier is an electrically-conductive membrane with a low resistance-capacitance (RC) time constant material, and wherein the capacitance of the charge barrier is less than 20 farads/gram.

62. A flow-through capacitor comprising:
(a) a plurality of electrodes; and
(b) a first charge barrier located between two of said plurality of electrodes, wherein the charge barrier is electrically connected to a first power supply, and at least one of the plurality of electrodes is electrically connected to a second power supply.

63. A flow-through capacitor comprising:
(a) a plurality of electrodes; and
(b) a first charge barrier located between two of said plurality of electrodes, wherein the flow-through capacitor comprises a series resistance of less than 50 ohm cm$^2$.

64. The flow-through capacitor of claim 63, wherein said flow-through capacitor further comprises a leakage resistance of greater than 1000 ohm cm$^2$.

65. A flow-through capacitor comprising:
(a) a plurality of electrodes; and
(b) a first charge barrier located between two of said plurality of electrodes, wherein the flow-through capacitor has a leakage resistance to series resistance ratio of greater than 100.

66. A flow-through capacitor comprising:
(a) a plurality of electrodes; and
(b) a first charge barrier located between two of said plurality of electrodes, wherein the electrodes within a cell of the flow-through capacitor are ionically insulated and connected electrically in series.

67. The flow-through capacitor of claim 66, further comprising a flow path adjacent to each of the electrodes.

68. A flow-through capacitor having an ionic efficiency, said flow-through capacitor comprising:
(a) a plurality of electrodes comprising an electrode material having a surface area for electrostatic adsorption of ions;
(b) a pore volume in one or more of said plurality of electrodes comprising pore volume loss; and
(c) means for enhancing the ionic efficiency of said flow-through capacitor by compensating for said pore volume loss.

69. A flow-through capacitor comprising:
(a) a plurality of electrodes comprising an electrode material having a surface area for electrostatic adsorption of ions;
(b) a pore volume in one or more of said plurality of electrodes, whereby said pore volume adsorbs and expels pore volume ions; and
(c) means for reducing said adsorption and expulsion of pore volume ions.

70. A flow-through capacitor comprising:
(a) a plurality of electrodes comprising an electrode material having a surface area for electrostatic adsorption of feed ions;
(b) a pore volume in one or more of said plurality of electrodes, whereby said pore volume contains pore ions; and
(c) means for providing an excess of feed ions to pore volume ions.

71. The flow-through capacitor of claim 70, further comprising a feed stream having a flow rate, and means for altering said flow rate.

72. The flow-through capacitor of claim 70, further comprising a source of voltage to said flow-through capacitor, and a means for altering said voltage.

73. The flow-through capacitor of claim 72, wherein said means for altering said voltage comprises a shunt.

74. The flow-through capacitor of claim 70, further comprising a means for recovering energy from said flow-through capacitor.

75. The flow-through capacitor of claim 70, wherein said flow-through capacitor has a polarity and further comprises means for reversing said polarity.

* * * * *

UNITED STATES PATENT AND TRADEMARK OFFICE
CERTIFICATE OF CORRECTION

PATENT NO. : 6,709,560 B2
DATED : March 23, 2004
INVENTOR(S) : Marc D. Andelson et al.

It is certified that error appears in the above-identified patent and that said Letters Patent is hereby corrected as shown below:

Column 1,
Lines 12-18, delete "(STATEMENT REGARDING FEDERALLY SPONSORED RESEARCH OR DEVELOPMENT. This invention was funded under contract with the United States Defense, Advanced Research Projects Agency (DARPA), under Contract No. DAAD 19-99-C-0033. The United States government may have certain rights in the invention.)"; and insert the following paragraph:
-- STATEMENT REGARDING FEDERALLY SPONSORED RESEARCH OR DEVELOPMENT. This invention was partially funded under contract with the United States Defense, Advanced Research Projects Agency (DARPA), under Contract No. DAAD 19-00-C-0448. The United States government may have certain rights in the invention. --.

Signed and Sealed this

Twenty-seventh Day of December, 2005

JON W. DUDAS
*Director of the United States Patent and Trademark Office*